United States Patent
Wang et al.

(10) Patent No.: US 12,489,924 B2
(45) Date of Patent: Dec. 2, 2025

(54) SCALING WINDOW IN VIDEO CODING

(71) Applicants: Beijing Bytedance Network Technology Co., Ltd., Beijing (CN); Bytedance Inc., Los Angeles, CA (US)

(72) Inventors: Ye-kui Wang, San Diego, CA (US); Zhipin Deng, Beijing (CN); Kai Zhang, San Diego, CA (US); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/514,689

(22) Filed: Nov. 20, 2023

(65) Prior Publication Data
US 2024/0089508 A1 Mar. 14, 2024

Related U.S. Application Data

(63) Continuation of application No. 17/990,267, filed on Nov. 18, 2022, now Pat. No. 11,825,124, which is a (Continued)

(30) Foreign Application Priority Data
May 21, 2020 (WO) ................ PCT/CN2020/091533

(51) Int. Cl.
H04N 19/70 (2014.01)
H04N 19/105 (2014.01)
(Continued)

(52) U.S. Cl.
CPC ........... *H04N 19/70* (2014.11); *H04N 19/105* (2014.11); *H04N 19/119* (2014.11);
(Continued)

(58) Field of Classification Search
CPC .... H04N 19/70; H04N 19/105; H04N 19/119; H04N 19/132; H04N 19/174; H04N 19/184; H04N 19/186; H04N 19/30
See application file for complete search history.

(56) References Cited

U.S. PATENT DOCUMENTS 10,499,068 B2 12/2019 Hannuksela
2018/0242008 A1 8/2018 Minoo
(Continued)

FOREIGN PATENT DOCUMENTS

CN 101646084 A 2/2010
CN 108293136 A 7/2018
(Continued)

OTHER PUBLICATIONS

Series H: Audiovisual and Multimedia Systems Infrastructure of audiovisual services—Coding of moving video High efficiency video coding ITU-T and ISO/IEC, "High efficiency video coding", Rec. ITU-T H.265 | ISO/IEC 23008-2 (in force edition), Feb. 2018, 692 pages.
(Continued)

*Primary Examiner* — Jae N Noh
(74) *Attorney, Agent, or Firm* — Conley Rose, P.C.

(57) ABSTRACT

Video processing, including video coding, video decoding and video transcoding, is described. One example method includes performing a conversion between a video comprising a video picture and a bitstream of a video according to a rule, where the rule specifies that syntax elements indicate a first width and a first height of a scaling window for the video picture, and where the rule specifies that a range of permissible values for the syntax elements include values greater than or equal to two times a second width of the video picture and two times a second height of the video picture.

20 Claims, 16 Drawing Sheets

Related U.S. Application Data continuation of application No. PCT/CN2021/095012, filed on May 21, 2021.

(51) Int. Cl.
    *H04N 19/119*     (2014.01)
    *H04N 19/132*     (2014.01)
    *H04N 19/174*     (2014.01)
    *H04N 19/184*     (2014.01)
    *H04N 19/186*     (2014.01)
    *H04N 19/30*     (2014.01)

(52) U.S. Cl.
    CPC ......... *H04N 19/132* (2014.11); *H04N 19/174* (2014.11); *H04N 19/184* (2014.11); *H04N 19/186* (2014.11); *H04N 19/30* (2014.11)

(56) References Cited

U.S. PATENT DOCUMENTS

| | | | |
|---|---|---|---|
| 2021/0185332 A1 | 6/2021 | Chuang | |
| 2021/0195172 A1 | 6/2021 | Chang | |
| 2022/0286667 A1* | 9/2022 | Lu | H04N 19/167 |
| 2023/0082583 A1* | 3/2023 | Wang | H04N 19/184 |
| | | | 375/240.02 |

FOREIGN PATENT DOCUMENTS

| | | |
|---|---|---|
| JP | 7506184 B2 | 6/2024 |
| WO | 2018127625 A1 | 7/2018 |

OTHER PUBLICATIONS

JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages. VTM software, Retrieved from the internet: https://vcgit.hhi.fraunhofer.de/jvet/VVCSoftware_VTM.git, Feb. 8, 2023, 3 pages.
JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.
JVET-S0048-v2, Wang, Y-K., et al., "AHG9/AHG8: On reference picture resampling," Joint Video Experts Team (JVET) of ITU-T SG 16 WP 3 and ISO/IEC JTC 1/SC 29/WG 11 19th Meeting: by teleconference, Jun. 22-Jul. 1, 2020, 4 pages.
Jvet-Q0334, Chang, Y-J., et al., "AhG8/AhG12: On the reference picture resampling for the subpictures," Joint Video Experts Team (JVET) of ITU-T SG 16 WP 3 and ISO/IEC JTC 1/SC 29/WG 11 17th Meeting: Brussels, BE, Jan. 7-17, 2020, 10 pages.
JVET-Q0333, Chang, Y-J., et al., "AhG12: On the subpicture-based scaling process," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.
JVET-R0278, Seregin, V., et al., "AHG8: On SPS sharing and slice type constraint," Joint Video Experts Team (JVET) of ITU-T SG 16 WP 3 and ISO/IEC JTC 1/SC 29/WG 11 18th Meeting: by teleconference, Apr. 15-24, 2020, 5 pages.
JVET-S0147-v2, Wang, Y-K., et al., "AHG12: A summary of proposals on scalability and RPR," Joint Video Experts Team (JVET) of ITU-T SG 16 WP 3 and ISO/IEC JTC 1/SC 29/WG 11 19th Meeting: by teleconference, Jun. 22-Jul. 1, 2020, 6 pages.
JVET-Q0262, Samuelsson, J., et al., "AHG9: On reference picture resampling enabled flag," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
Document: JVET-R0114, Samuelsson, J., et al., "AHG 9: On scaling window offsets," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-O0204, Samuelsson, J., et al., "AHG8: Adaptive Resolution Change (ARC) High-Level Syntax (HLS)," Joint Video Experts Team (JVET) of ITU-T SG 16 WP 3 and ISO/IEC JTC 1/SC 29/WG 11 15th Meeting: Gothenburg, SE, Jul. 3-12, 2019, 8 pages.
Document: JVET-Q0332, Choi, B., et al., "AHG8: Signaling and Filtering for Reference Picture Resampling," Joint Video Experts Team (JVET) of ITU-T SG 16 WP 3 and ISO/IEC JTC 1/SC 29/WG 11 15th Meeting: Gothenburg, SE, Jul. 3-12, 2019, 10 pages.
Foreign Communication From A Related Counterpart Application, European Application No. 21807814.5, Extended European Search Report dated May 19, 2023, 12 pages.
Foreign Communication From A Related Counterpart Application, PCT Application No. PCT/CN2021/095012, International Search Report dated Aug. 25, 2021, 11 pages.
Foreign Communication From A Related Counterpart Application, PCT Application No. PCT/CN2021/095013, International Search Report dated Jul. 22, 2021, 12 pages.
Non-Final Office Action from U.S. Appl. No. 17/990,267 dated Apr. 6, 2023.
Document: JVET-R0114-v3, Samuelsson, J., et al., "AHG 9: On scaling window offsets," Joint Video Experts Team (JVET) of ITU-T SG 16 WP3 and ISO/IEC JTC 1/SC 29/WG 11 18th Meeting: by teleconference, Apr. 15-24, 2020, 4 pages.
Japanese Notice of Allowance from Japanese Patent Application No. 2022-570205 dated May 14, 2024, 6 pages.
Document: JVET-S0048-v2, Wang, Y.K., et al., "AHG9/AHG8: On reference picture resampling," Joint Video Experts Team (JVET) of ITU-T SG 16 WP 3 and ISO/IEC JTC 1/SC 29/WG 11 19th Meeting: by teleconference, Jun. 22-Jul. 1, 2020, 4 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Document: JVET-Q0334-v2, Chang, Y-J., et al., "AhG8/AhG12: On the reference picture resampling for the subpictures," Joint Video Experts Team (JVET) of ITU-T SG 16 WP 3 and ISO/IEC JTC 1/SC 29/WG 11 17th Meeting: Brussels, BE, Jan. 7-17, 2020, 10 pages.
Singapore Office Action from Singapore Patent Application No. 11202260430V dated Sep. 9, 2025, 9 pages.
Brazilian Notice of Allowance from Brazilian Patent Application No. 112022023391-4 dated Jul. 8, 2025, 10 pages.

* cited by examiner

SCALING WINDOW IN VIDEO CODING

CROSS REFERENCE TO RELATED APPLICATIONS

This application is a continuation application of U.S. application Ser. No. 17/990,267, filed on Nov. 18, 2022, which is a continuation of International Patent Application No. PCT/CN2021/095012 filed on May 21, 2021, which claims the priority to and benefits of International Patent Application No. PCT/CN2020/091533, filed on May 21, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders for processing coded representation of video using control information useful for decoding of the coded representation.

In one example aspect, a video processing method is disclosed. The method includes performing a conversion between a video comprising a video picture and a bitstream of a video according to a rule, wherein the rule specifies that syntax elements indicate a first width and a first height of a scaling window for the video picture, and wherein the rule specifies that a range of permissible values for the syntax elements include values greater than or equal to two times a second width of the video picture and two times a second height of the video picture.

In another example aspect, a video processing method is disclosed. The method includes determining, for a conversion between a video picture of a video and a bitstream of the video, whether or how (1) a first width or a first height of a first scaling window of a reference video picture of the video and (2) a second width or a second height of a second scaling window of a current video picture are constrained according to a rule; and performing the conversion according to the determining.

In another example aspect, a video processing method is disclosed. The method includes performing a conversion between a video comprising a video picture comprising one or more video slices and a bitstream of the video, wherein the bitstream conforms to a rule that specifies that a width and a height of a scaling window of the video picture determine a value of a variable that specifies whether a resampling of a j-th reference video picture in an i-th reference picture list is enabled for a video slice of the video picture, where i and j are integers.

In another example aspect, a video processing method is disclosed. The method includes performing a conversion between a video comprising one or more video pictures and a bitstream of a video according to a format rule, wherein the format rule specifies that a syntax element is included in a sequence parameter set, and wherein the syntax element indicates whether a reference picture resampling is enabled for a reference picture and whether one or more slices of a current video picture in a coded layer video sequence is allowed to refer to a reference picture in an active entry in a reference picture list, and wherein the reference picture has any one or more of following six parameters that are different than that of the current video picture: 1) a video picture width, 2) a video picture height, 3) a scaling window left offset, 4) a scaling window right offset, 5) a scaling window top offset, and 6) a scaling window bottom offset.

In another example aspect, a video processing method is disclosed. The method includes performing a conversion between a video comprising one or more video pictures and a bitstream of a video according to a format rule, wherein the format rule specifies that a syntax element is included in a sequence parameter set, wherein the format rule specifies that a value of the syntax element is based on (1) whether a current video layer referring to the sequence parameter set is not an independent video layer and (2) information of one or more reference video layers associated with the current video layer, wherein a video layer is an independent video layer when the video layer does not depend on one or more other video layers, and wherein the video layer is not an independent video layer when the video layer depends on one or more other video layers.

In another example aspect, a video processing method is disclosed. The method includes performing a conversion between a video comprising one or more video pictures and a bitstream of the video according to a format rule, wherein the format rule specifies that a syntax element is indicated in a sequence parameter set referred to by the one or more video pictures; and wherein the syntax element indicates whether reference picture resampling is enabled for one or more reference pictures that are in a same layer as the one or more video pictures.

In another example aspect, a video processing method is disclosed. The method includes performing a conversion between a video comprising one or more video pictures and a coded representation of a video, wherein the coded representation conforms to a format rule; wherein the format rule specifies that one or more syntax elements included in the coded representation related to a scaling window are permitted to have a value that indicates that a height or a width of the scaling window is greater than or equal to that of a corresponding video picture.

In another example aspect, another video processing method is disclosed. The method includes performing a conversion between a video comprising one or more video pictures in one or more video layers and a coded representation of a video, wherein the coded representation conforms to a format rule; wherein the format rule specifies that permitted values of one or more syntax elements included in the coded representation related to a scaling window are constrained by a constraint rule, wherein the constraint rule depends on a relationship between a first layer of a current picture and a second layer of a reference picture of the current picture.

In another example aspect, another video processing method is disclosed. The method includes performing a conversion between a video comprising one or more video layers comprising one or more video pictures a coded representation of a video, wherein the coded representation conforms to a format rule, wherein the format rule specifies that a syntax element is included in the coded representation in a parameter set, wherein the syntax element is indicative of whether reference picture resampling is enabled for a non-independent video layer, wherein a value of the syntax element is a function of a reference layer of the non-independent video layer.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present disclosure.

DETAILED DESCRIPTION

Figure 2:
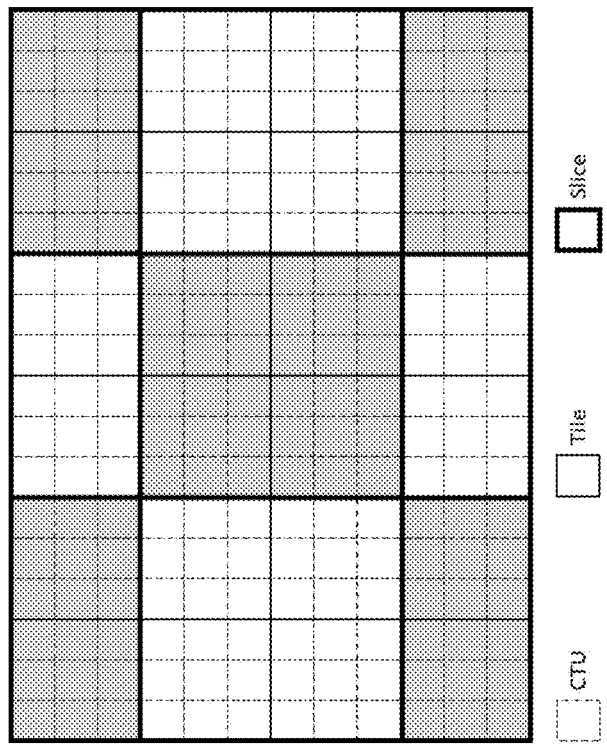
FIG. 2 shows an example of rectangular slice partitioning of a picture, where the picture is divided into 24 tiles (6 tile columns and 4 tile rows) and 9 rectangular slices.

Section headings are used in the present disclosure for ease of understanding and do not limit the applicability of embodiments disclosed in each section only to that section. Furthermore, H.266 terminology is used in some description only for ease of understanding and not for limiting scope of the disclosed embodiments. As such, the embodiments described herein are applicable to other video codec protocols and designs also.

1. INTRODUCTION

The present disclosure is related to video coding technologies. Specifically, it is about improved support of reference picture resampling (RPR) in video coding, including specifying the value ranges of scaling window offsets and signalling of the control of RPR and resolution change within a coded video sequence of a layer. The ideas may be applied individually or in various combination, to any video coding standard or non-standard video codec that supports multi-layer video coding, e.g., the being-developed Versatile Video Coding (VVC).

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
JEM Joint Exploration Model
LTRP Long-Term Reference Picture
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RAP Random Access Point
RBSP Raw Byte Sequence Payload
SE Syntax Element
SEI Supplemental Enhancement Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and wavefront parallel processing (WPP), which may be applied for maximum transfer unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTB s, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiplied by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signalled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
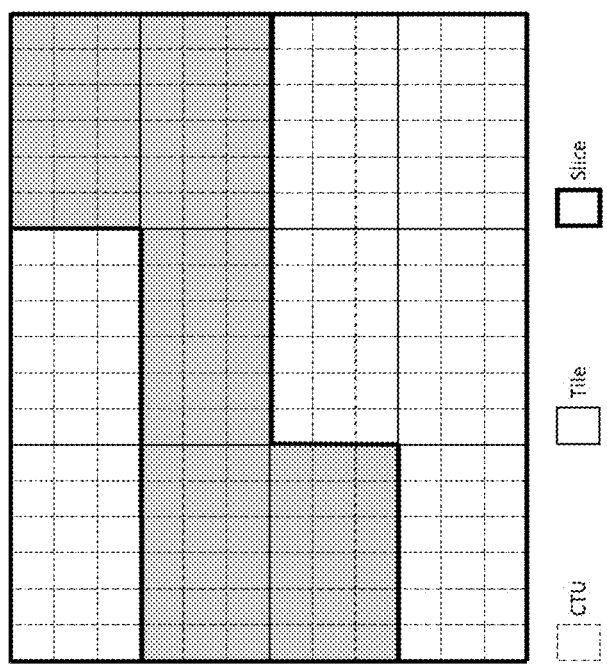
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figure 3:
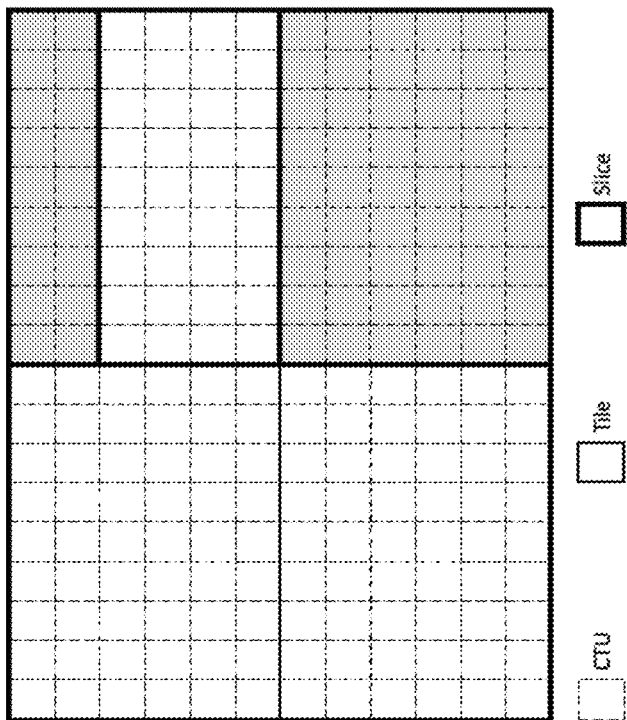
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
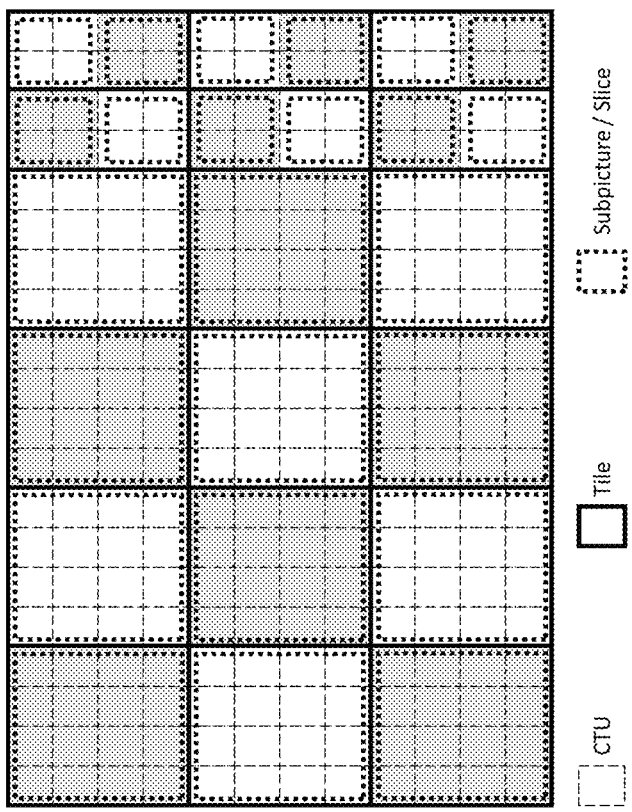
FIG. 4 shows a picture that is partitioned into 15 tiles, 24 slices and 24 subpictures.

FIG. 4 shows an example of subpicture partitioning of a picture, where a picture is partitioned into 18 tiles: 12 on the left-hand side, each covering one slice of 4-by-4 CTUs; and 6 tiles on the right-hand side, each covering 2 vertically-stacked slices of 2-by-2 CTUs, altogether resulting in 24 slices and 24 subpictures of varying dimensions (each slice is a subpicture).

3.3. Picture Resolution Change within a Sequence

In AVC and HEVC, the spatial resolution of pictures cannot change unless a new sequence using a new SPS starts, with an intra random access points (IRAP) picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be greater than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually, the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signalled in the PPS instead of in the SPS, while in the SPS the maximum picture resolution is signalled; and ii) for a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the multiview or three-dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. For example, the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the hypertext transfer protocol live streaming (HLS) aspects have been significantly simplified at the sacrifice of some flexibilities. For example, an IRAP AU is required to contain a picture for each of the layers present in the CVS.

3.5. Viewport-Dependent 360° Video Streaming Based on Subpictures

In streaming of 360° video (also referred to as omnidirectional video), at any particular moment only a subset (i.e., the current viewport) of the entire omnidirectional video sphere would be rendered to the user, while the user can turn his/her head anytime to change the viewing orientation and consequently the current viewport. While it is desirable to have at least some lower-quality representation of the area not covered by the current viewport available at the client and ready to be rendered to the user just in case the user suddenly changes his/her viewing orientation to anywhere on the sphere, a high-quality representation of the omnidirectional video is only needed for the current viewport that is being rendered to the use right now. Splitting the high-quality representation of the entire omnidirectional video into subpictures at an appropriate granularity enables such an optimization. Using VVC, the two representations can be encoded as two layers that are independent from each other.

Figure 5:
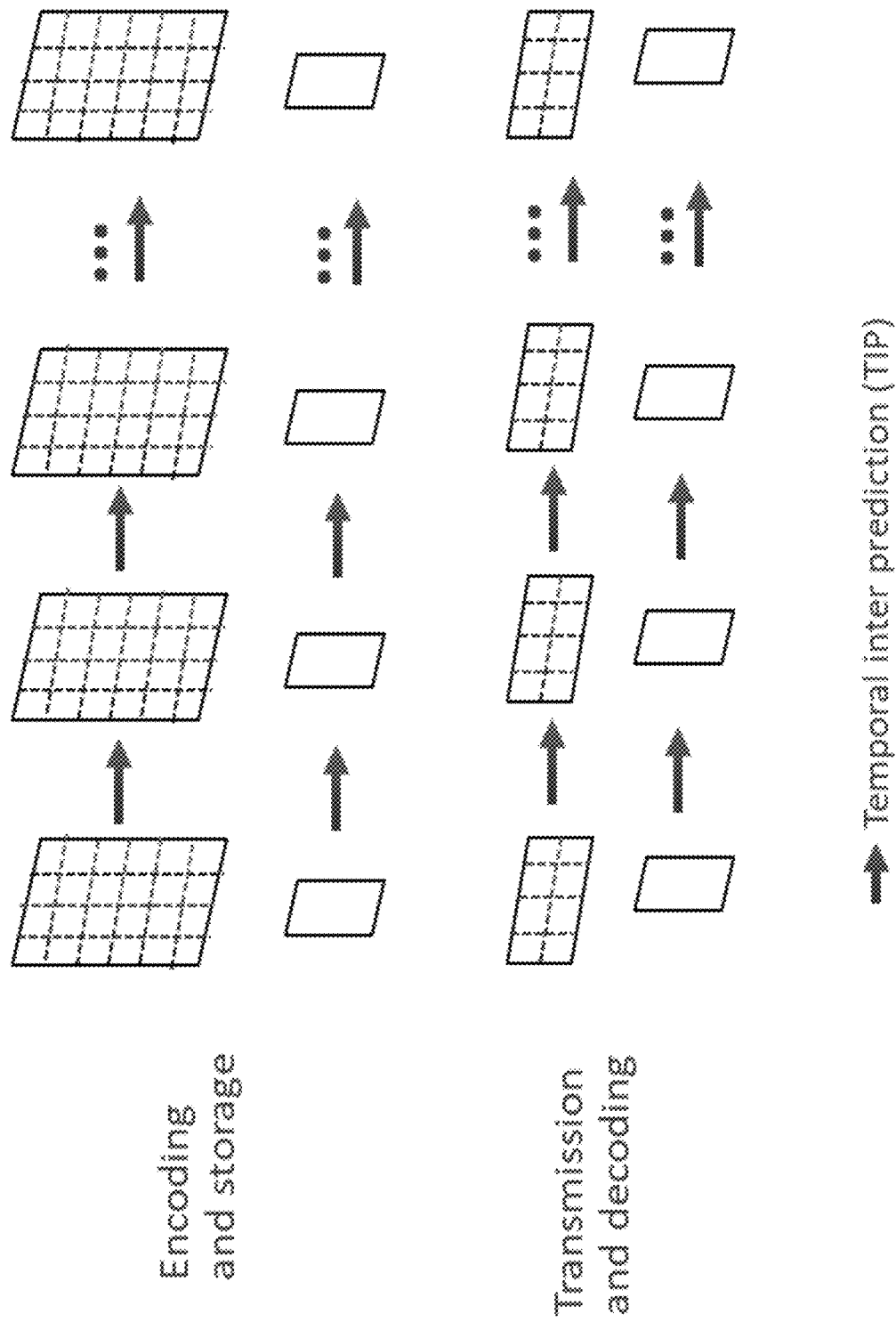
FIG. 5 shows a typical subpicture-based viewport-dependent 360° video coding scheme.

FIG. 5 shows a typical subpicture-based viewport-dependent 360° video coding scheme.

A typical subpicture-based viewport-dependent 360° video delivery scheme is shown in FIG. 5, wherein a higher-resolution representation of the full video consists of subpictures, while a lower-resolution representation of the full video does not use subpictures and can be coded with less-frequent random access points than the higher-resolution representation. The client receives the full video in the lower-resolution, and for the higher-resolution video, the client only receives and decodes the subpictures that cover the current viewport.

Figure 6:
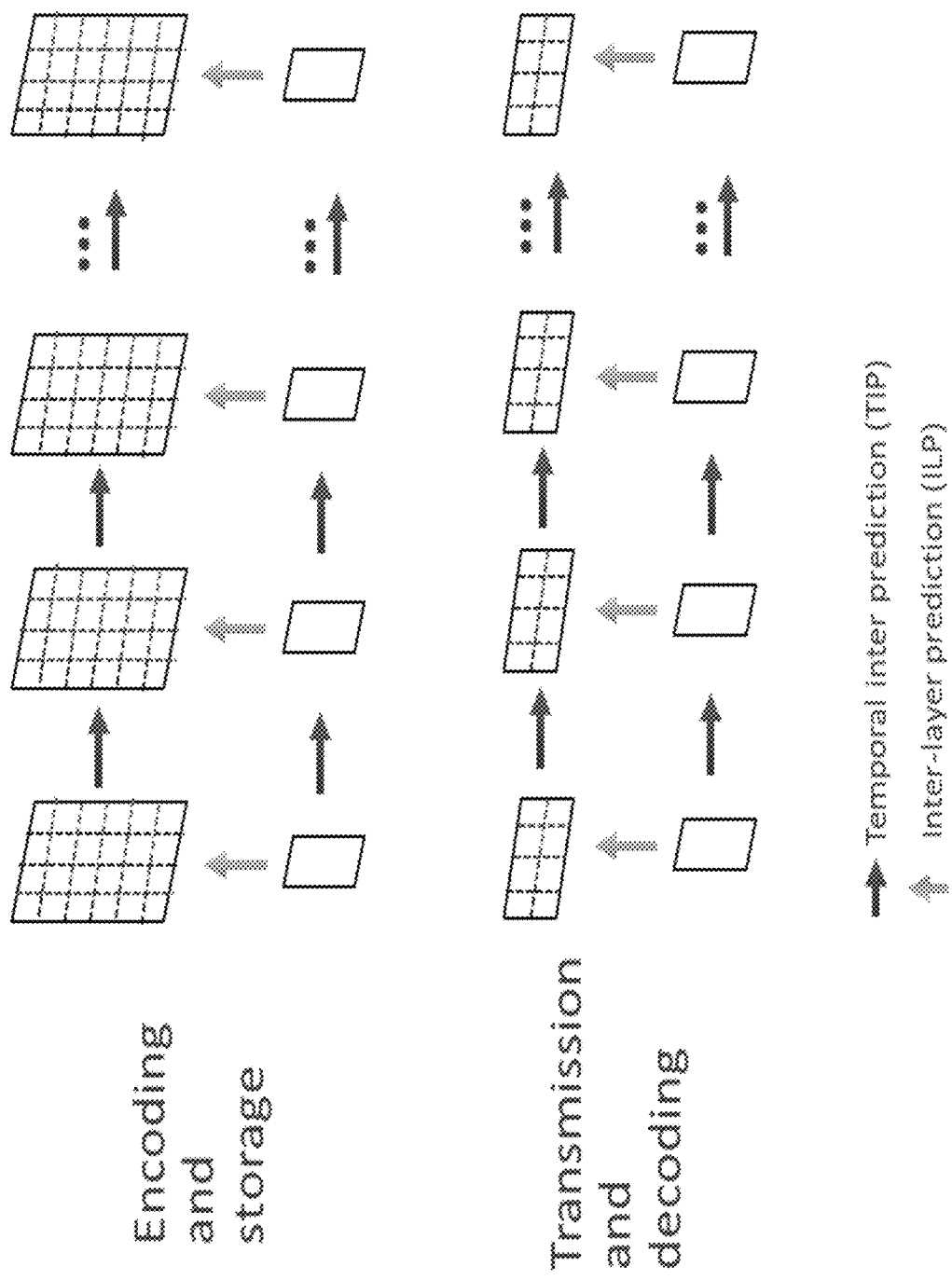
FIG. 6 shows an improved viewport-dependent 360° video coding scheme based on subpictures and spatial scalability.

The latest VVC draft specification also supports the improved 360° video coding scheme as shown in FIG. 6. The only difference compared to the approach shown in FIG. 5 is that inter-layer prediction (ILP) is applied for the approach shown in FIG. 6.

FIG. 6 shows an improved viewport-dependent 360° video coding scheme based on subpictures and spatial scalability.

3.6. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

4. TECHNICAL PROBLEMS SOLVED BY DISCLOSED TECHNICAL SOLUTIONS

The existing design in the latest VVC text (in JVET-R2001-vA/v10) has the following problems:
1) In the latest VVC text, the variables CurrPicScalWinWidthL and CurrPicScalWinHeightL are derived as follows:

CurrPicScalWinWidthL=pps_pic_width_in_luma_samples−
SubWidthC*(pps_scaling_win_right_offset+
pps_scaling_win_left_offset)     (79)

CurrPicScalWinHeightL=pps_pic_height_in_luma_samples−
SubHeightC*(pps_scaling_win_bottom_offset+
pps_scaling_win_top_offset)     (80)

And the value ranges of the scaling window offset syntax elements are specified as follows:
The value of SubWidthC*(Abs(pps_scaling_win_left_offset)+Abs(pps_scaling_win_right_offset)) shall be less than pps_pic_width_in_luma_samples, and the value of SubHeightC*(Abs(pps_scaling_win_top_offset)+Abs(pps_scaling_win_bottom_offset)) shall be less than pps_pic_height_in_luma_samples.
Consequently, the value of the scaling window width CurrPicScalWinWidthL is always less than twice the picture width, i.e., pps_pic_width_in_luma_samples*2, and the scaling window height CurrPicScalWinHeightL is always less than twice the picture height, i.e., pps_pic_height_in_luma_samples*2.
However, such value ranges of the scaling window width and height are too restrictive. For example, for the improved 360° video coding scheme as shown in FIG. 6, assuming that the each EL picture (covering the full sphere of 360°×180°) is split into 12×8=96 subpictures, and the user's viewport is 120°×90°, i.e., about 4×4 subpictures of each EL picture are received and decoded by the decoder and rendered to the user. In the sub-bitstream extraction to generate the bitstream to send to the decoder (i.e., as in the lower part of FIG. 6), the PPSs (which contain the scaling window offset parameters) of the BL pictures remain unchanged, while the PPSs of the EL pictures would be rewritten. Assuming that in the original bitstream (before sub-bitstream extraction, as in the upper part of FIG. 6) the scaling window offsets for EL pictures are all equal to 0, then the values of CurrPicScalWinWidthL and CurrPicScalWinHeightL for an EL picture in the original bitstream would be the same as the picture width and height, respectively. However, in the bitstream received by the decoder (after sub-bitstream extraction, like in the low part of FIG. 6), the values of CurrPicScalWinWidthL and CurrPicScalWinHeightL for an EL picture would need to be equal to three times the picture width, pps_pic_width_in_luma_samples*3, and twice the picture height, pps_pic_height_in_luma_samples*2, respectively.

However, this would violate the existing value ranges of the scaling window offset syntax elements.

2) In the latest VVC text, the variable RprConstraintsActive[i][j], specifying whether RPR is on for the reference picture of the j-th entry in reference picture list i for the current slice, is derived as follows:

RprConstraintsActive[i][j]=(pps_pic_width_in_luma_samples !=refPicWidth
||pps_pic_height_in_luma_samples !=refPicHeight||
pps_scaling_win_left_offset !=refScalingWinLeftOffset||
pps_scaling_win_right_offset !=refScalingWinRightOffset||
pps_scaling_win_top_offset !=refScalingWinTopOffset||
pps_scaling_win_bottom_offset !=refScalingWinBottomOffset)

Basically, as long as one of the six parameters of the current picture is different from that of the reference picture, the value of this variable is equal to 1, and RPR is on: 1) picture width, 2) picture height, 3) scaling window left offset, 4) scaling window right offset, 5) scaling window top offset, and 6) scaling window bottom offset.

However, this disallows the use of the some coding tools, e.g., decoder-side motion vector refinement (DMVR), bi-directional optical flow (BDOF), prediction refinement with optical flow (PROF), for the EL pictures in the improved 360° video coding scheme as shown in FIG. 6, even when in the original bitstream (as in the upper part of FIG. 6) the spatial resolution of the EL picture and the BL are the same.

3) The semantics of sps_ref_pic_resampling_enabled_flag are as follows:

sps_ref_pic_resampling_enabled_flag equal to 1 specifies that reference picture resampling is enabled and one or more slices of pictures in the CLVS may refer to a reference picture with a different spatial resolution in an active entry of a reference picture list. sps_ref_pic_resampling_enabled_flag equal to 0 specifies that reference picture resampling is disabled and no slice of pictures in the CLVS refers to a reference picture with a different spatial resolution in an active entry of a reference picture list.

However, whether RPR is on depends on whether all the following six parameters of the current picture and the current picture are the same, not just picture width and height: 1) picture width, 2) picture height, 3) scaling window left offset, 4) scaling window right offset, 5) scaling window top offset, and 6) scaling window bottom offset. Therefore, the semantics are not aligned with how RPR is to be determined to be on or off.

4) The value of sps_ref_pic_resampling_enabled_flag may need to be specified to be based on whether a certain layer related to the SPS is not an independent layer and based on information of the reference layers of that layer.

5) There lacks a signalling control for enabling or disabling RPL from reference pictures in the same layer as the current picture.

5. A LISTING OF EMBODIMENTS AND SOLUTIONS

To solve the above problems, and others, methods as summarized below are disclosed. The embodiments should be considered as examples to explain the general concepts and should not be interpreted in a narrow way. Furthermore, these embodiments can be applied individually or combined in any manner.

1) To solve problem 1, the value ranges of SEs indicating the scaling window (e.g., pps_scaling_win_left_offset, pps_scaling_win_right_offset, pps_scaling_win_top_offset, and pps_scaling_win_bottom_offset) are specified in a manner such that the scaling window width and height may be greater than or equal to twice the picture width and twice the picture height, respectively.
   a. In one example, it is specified that the value of SubWidthC*(pps_scaling_win_left_offset+pps_scaling_win_right_offset)) shall be greater than or equal to −pps_pic_width_in_luma_samples*M and less than pps_pic_width_in_luma_samples, and the value of SubHeightC*(pps_scaling_win_top_offset+pps_scaling_win_bottom_offset) shall be greater than or equal to −pps_pic_height_in_luma_samples*N and less than pps_pic_height_in_luma_samples, where M and N are positive integer values that are equal to or greater than 2.
      i. In some examples, M and N are the same and equal to 16, 8, 32, or 64.
      ii. In some other example, M and N are specified to be dependent on the layout of subpictures.
         a) In one example, M is equal to Ceil(pps_pic_width_in_luma_samples÷minSubpicWidth), where minSubpicWidth is the minimum subpicure width of all subpictures in the pictures referring to the PPS, N is equal to Ceil(pps_pic_height_in_luma_samples÷minSubpicHeight), where minSubpicHeight is the minimum subpicure height of all subpictures in the pictures referring to the PPS.
2) Whether to and/or how to constrain the width/height of the scaling window of the reference picture and the scaling window of the current picture may depend on whether the reference picture and the current picture are in the same layer or not (such as with the same layer id or not).
   a. In one example, there is no constraints on the width/height of the scaling window of the reference picture and the scaling window of the current picture in case that the reference picture and the current picture are in different layers.
   b. Suppose it is a requirement of bitstream conformance that all of the following conditions shall be satisfied:
CurrPicScalWinWidthL*M is greater than or equal to refPicScalWinWidthL.
CurrPicScalWinHeightL*M is greater than or equal to refPicScalWinHeightL.

CurrPicScalWinWidthL is less than or equal to refPicScalWinWidthL*N.

CurrPicScalWinHeightL is less than or equal to refPicScalWinHeightL*N.

CurrPicScalWinWidthL*sps_pic_width_max_in_luma_samples is greater than or equal to refPicScalWinWidthL*(pps_pic_width_in_luma_samples−Max(K0, MinCbSizeY)).

CurrPicScalWinHeightL*sps_pic_height_max_in_luma_samples is greater than or equal to refPicScalWinHeightL*(pps_pic_height_in_luma_samples−Max(K1, MinCbSizeY)).

wherein CurrPicScalWinWidthL and CurrPicScalWinHeightL represent the width and height of the scaling window of the current picture, respectively, and refPicScalWinWidthL and refPicScalWinHeightL represent the width and height of the scaling window of the reference picture.

Suppose M=M1 and N=N1 when the reference picture and the current picture are in the same layer. M=M2 and N=N2 when the reference picture and the current picture are in different layers.
  i. In one example, M1<=M2.
  ii. In one example, N1>=N2.
  iii. In one example, K0/K1 is an integer value.
  iv. In one example, K0/K1 is the minimum allowed picture width/height, e.g., 8.

3) To solve problem 2, the derivation of the variable RprConstraintsActive[i][j], specifying whether RPR is on for the reference picture of the j-th entry in reference picture list i for the current slice, may be specified to be only dependent on the width and height of the scaling window.
  a. In one example, the variable RprConstraintsActive[i][j] is derived as follows: RprConstraintsActive[i][j]=(CurrPicScalWinWidthL !=fRefWidth∥CurrPicScalWinHeightL !=fRefHeight)
    Where fRefWidth and fRefHeight are the values of CurrPicScalWinWidthL and CurrPicScalWinHeightL, respectively, of the reference picture.
  b. In one example, the derivation of the variable RprConstraintsActive[i][j] may be dependent on the layer information of a reference picture and current picture.
    i. In one example, the derivation of the variable RprConstraintsActive[i][j], specifying whether RPR is on for the reference picture of the j-th entry in reference picture list i for the current slice, may be specified differently depending on whether the reference picture and the current picture are in the same layer or not (such as with the same layer id or not).

4) To solve problem 3, the semantics of sps_ref_pic_resampling_enabled_flag may be changed to be as follows:
  sps_ref_pic_resampling_enabled_flag equal to 1 specifies that reference picture resampling is enabled and one or more slices of pictures in the CLVS may refer to a reference picture in an active entry of a reference picture list that has one or more of the following 6 parameters different than that of the current picture: 1) picture width, 2) picture height, 3) scaling window left offset, 4) scaling window right offset, 5) scaling window top offset, and 6) scaling window bottom offset. sps_ref_pic_resampling_enabled_flag equal to 0 specifies that reference picture resampling is disabled and no slice of pictures in the CLVS refers to a reference picture in an active entry of a reference picture list that has one or more of the above 6 parameters different than that of the current picture.

5) To solve problem 4, the value of sps_ref_pic_resampling_enabled_flag is specified to be based on whether certain layer related to the SPS is not an independent layer and based on information of the reference layers of that layer.
  a. In one example, it is constrained that the value of sps_ref_pic_resampling_enabled_flag shall be equal to 1 when the layer with nuh_layer_id equal to the nuh_layer_id of the SPS is not an independent layer and at least one reference layer of the current layer has a different spatial resolution than the current layer.
  b. In one example, it is constrained that the value of sps_ref_pic_resampling_enabled_flag shall be equal to 1 when at least one layer that refers to the SPS is not an independent layer and at least one reference layer of such a layer has a different spatial resolution than the current layer.
  c. In one example, it is constrained that the value of sps_ref_pic_resampling_enabled_flag shall be equal to 1 when at least one slice of at least one picture currPic that refers to the SPS refers to a reference picture in an ILRP entry of a reference picture list that has one or more of the following 6 parameters different than that of the picture currPic: 1) picture width, 2) picture height, 3) scaling window left offset, 4) scaling window right offset, 5) scaling window top offset, and 6) scaling window bottom offset.

6) To solve problem 5, the flag sps_res_change_in_clvs_allowed_flag is renamed to be sps_intra_layer_rpr_enabled_flag, and the semantics are changed to be as follows: sps_intra_layer_rpr_enabled_flag equal to 1 specifies that reference picture resampling is enabled for pictures in the CLVS for inter prediction from reference pictures in the same layer as the current pictures, i.e., slices of picture in the CLVS may refer to a reference picture in an active entry of a reference picture list that has the same nuh_layer_id value as the current picture and has one or more of the following 6 parameters different than that of the current picture: 1) picture width, 2) picture height, 3) scaling window left offset, 4) scaling window right offset, 5) scaling window top offset, and 6) scaling window bottom offset. sps_intra_layer_rpr_enabled_flag equal to 0 specifies that reference picture resampling from reference pictures in the same layer as the current picture is disabled and no slice of pictures in the CLVS refers to a reference picture in an active entry of a reference picture list that has the same nuh_layer_id value as the current picture and has one or more of the above 6 parameters different than that of the current picture.
  a. Alternatively, sps_intra_layer_rpr_enabled_flag equal to 1 specifies that reference picture resampling is enabled for pictures in the CLVS for inter prediction from a reference picture in the same layer as the current pictures and the reference picture is associated with RprConstraintsActive[i][j] being equal to 1 wherein the j-th entry in reference picture list i for the current slice and it has the same nul_layer_id value as the current picture.

b. In one example, sps_intra_layer_rpr_enabled_flag and sps_res_change_in_clvs_allowed_flag (with the semantics in JVET-R2001) may be signalled sequentially.
  i. sps_res_change_in_clvs_allowed_flag may be signalled after sps_intra_layer_rpr_enabled_flag.
  ii. sps_res_change_in_clvs_allowed_flag is not signalled and inferred to be 0 if sps_intra_layer_rpr_enabled_flag is 0.

6. EMBODIMENTS

Below are some example embodiments for some of the embodiments summarized above in Section 5, which can be applied to the VVC specification. The changed texts are based on the latest VVC text in JVET-R2001-vA/v10. Most relevant parts that have been added or modified are indicated in bold italicized text, and some of the deleted parts are marked by open and closed double brackets (e.g., [[ ]]) with deleted text in between the double brackets. There may be some other changes that are editorial in nature and thus not highlighted.

6.1. First Embodiment

This embodiment is for items 1, 1.a, 1.a.i, and 4.

7.4.3.3 Sequence Parameter Set RBSP Semantics sps_ref_pic_resampling_enabled_flag equal to 1 specifies that reference picture resampling is enabled and one or more slices of pictures in the CLVS may refer to a reference picture [[with a different spatial resolution]] in an active entry of a reference picture list that has one or more of the following 6 parameters different than that of the current picture: 1) picture width, 2) picture height, 3) scaling window left offset, 4) scaling window right offset, 5) scaling window top offset, and 6) scaling window bottom offset. sps_ref_pic_resampling_enabled_flag equal to 0 specifies that reference picture resampling is disabled and no slice of pictures in the CLVS refers to a reference picture [[with a different spatial resolution]] in an active entry of a reference picture list that has one or more of the above 6 parameters different than that of the current picture.

NOTE 2—When sps_ref_pic_resampling_enabled_flag is equal to 1, for a current picture the reference picture [[with a different spatial resolution]] that has one or more of the above 6 parameters different than that of the current picture may either belong to the same layer or a different layer than the layer containing the current picture.

sps_res_change_in_clvs_allowed_flag equal to 1 specifies that the picture spatial resolution may change within a CLVS referring to the SPS. sps_res_change_in_clvs_allowed_flag equal to 0 specifies that the picture spatial resolution does not change within any CLVS referring to the SPS. When not present, the value of sps_res_change_in_clvs_allowed_flag is inferred to be equal to 0.

7.4.3.4 Picture Parameter Set RBSP Semantics pps_scaling_window_explicit_signalling_flag equal to 1 specifies that the scaling window offset parameters are present in the PPS. pps_scaling_window_explicit_signalling_flag equal to 0 specifies that the scaling window offset parameters are not present in the PPS. When sps_ref_pic_resampling_enabled_flag is equal to 0, the value of pps_scaling_window_explicit_signalling_flag shall be equal to 0. pps_scaling_win_left_offset, pps_scaling_win_right_offset, pps_scaling_win_top_offset, and pps_scaling_win_bottom_offset specify the offsets that are applied to the picture size for scaling ratio calculation. When not present, the values of pps_scaling_win_left_offset, pps_scaling_win_right_offset, pps_scaling_win_top_offset, and pps_scaling_win_bottom_offset are inferred to be equal to pps_conf_win_left_offset, pps_conf_win_right_offset, pps_conf_win_top_offset, and pps_conf_win_bottom_offset, respectively. The value of SubWidthC*([[Abs(]]pps_scaling_win_left_offset[[)]]+[[Abs(]]pps_scaling_win_right_offs et[[)]]) shall be greater than or equal to −pps_pic_width_in_luma_samples*16 and less than pps_pic_width_in_luma_samples, and the value of SubHeightC*([[Abs(]]pps_scaling_win_top_offset[[)]]+[[Abs(]]pps_scaling_win_bottom_offset[[)]]) shall be greater than or equal to −pps_pic_height_in_luma_samples*16 and less than pps_pic_height_in_luma_samples.

The variables CurrPicScalWinWidthL and CurrPicScalWinHeightL are derived as follows:

$$CurrPicScalWinWidthL=pps\_pic\_width\_in\_luma\_samples-SubWidthC*(pps\_scaling\_win\_right\_offset+pps\_scaling\_win\_left\_offset) \quad (79)$$

$$CurrPicScalWinHeightL=pps\_pic\_height\_in\_luma\_samples-SubHeightC*(pps\_scaling\_win\_bottom\_offset+pps\_scaling\_win\_top\_offset) \quad (80)$$

Let refPicScalWinWidthL and refPicScalWinHeightL be the CurrPicScalWinWidthL and CurrPicScalWinHeightL, respectively, of a reference picture of a current picture referring to this PPS. It is a requirement of bitstream conformance that all of the following conditions shall be satisfied:

CurrPicScalWinWidthL*2 is greater than or equal to refPicScalWinWidthL.

CurrPicScalWinHeightL*2 is greater than or equal to refPicScalWinHeightL.

CurrPicScalWinWidthL is less than or equal to refPicScalWinWidthL*8.

CurrPicScalWinHeightL is less than or equal to refPicScalWinHeightL*8.

CurrPicScalWinWidthL*sps_pic_width_max_in_luma_samples is greater than or equal to refPicScalWinWidthL*(pps_pic_width_in_luma_samples−Max(8, MinCbSizeY)).

CurrPicScalWinHeightL*sps_pic_height_max_in_luma_samples is greater than or equal to refPicScalWinHeightL*(pps_pic_height_in_luma_samples−Max(8, MinCbSizeY)).

Figure 7:
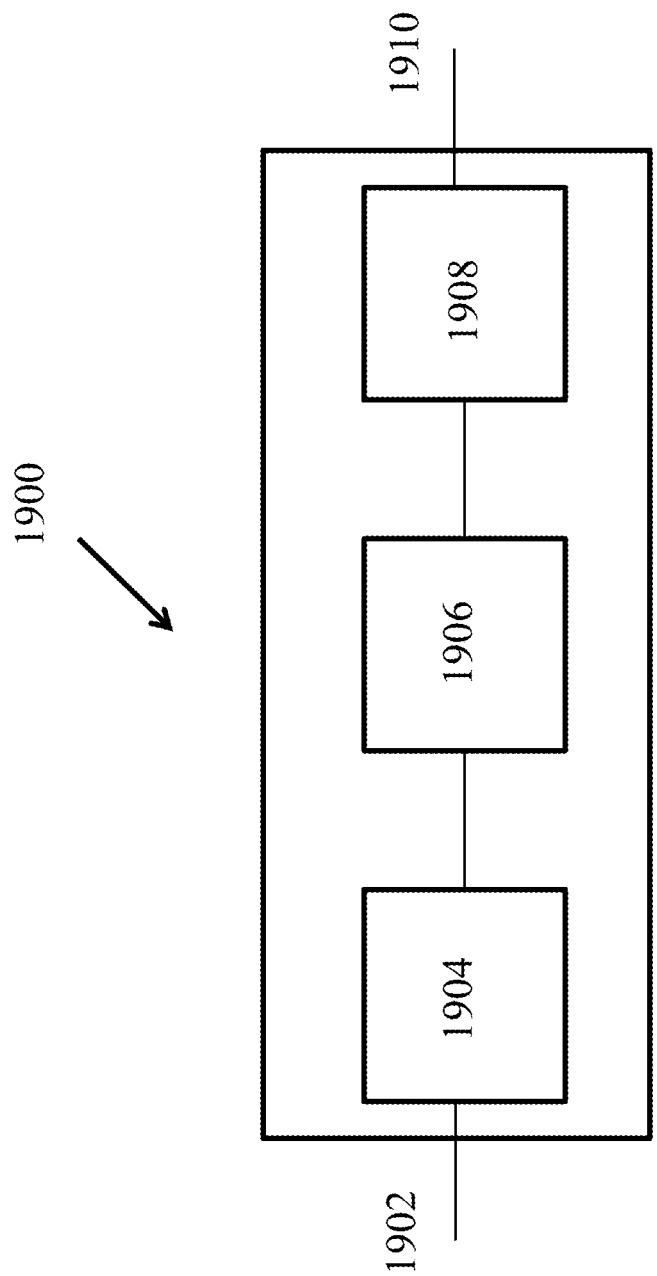
FIG. 7 is a block diagram of an example video processing system.

FIG. 7 is a block diagram showing an example video processing system 1900 in which various embodiments disclosed herein may be implemented. Various implementations may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 8:
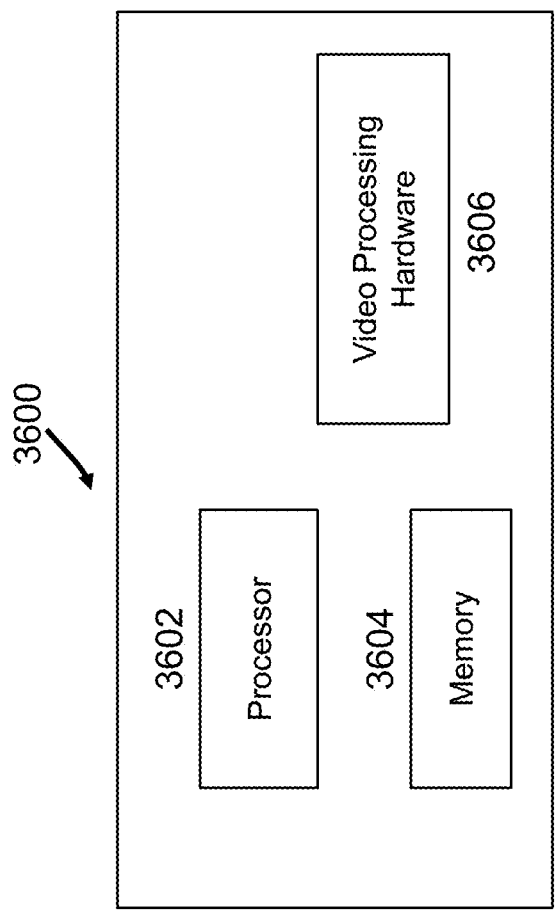
FIG. 8 is a block diagram of a video processing apparatus.

FIG. 8 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 10:
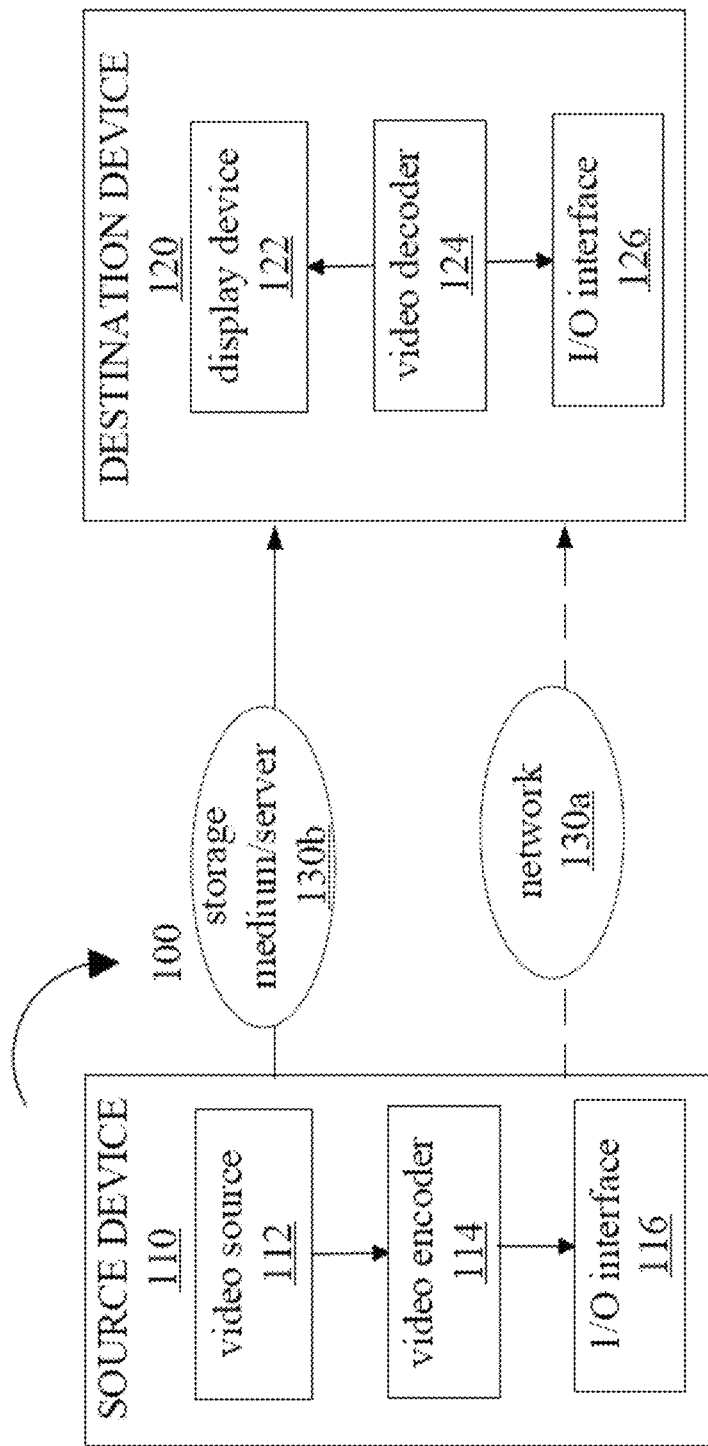
FIG. 10 is a block diagram that illustrates a video coding system in accordance with some embodiments of the present disclosure.

FIG. 10 is a block diagram that illustrates an example video coding system 100 that may utilize the embodiments of this disclosure.

As shown in FIG. 10, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 11:
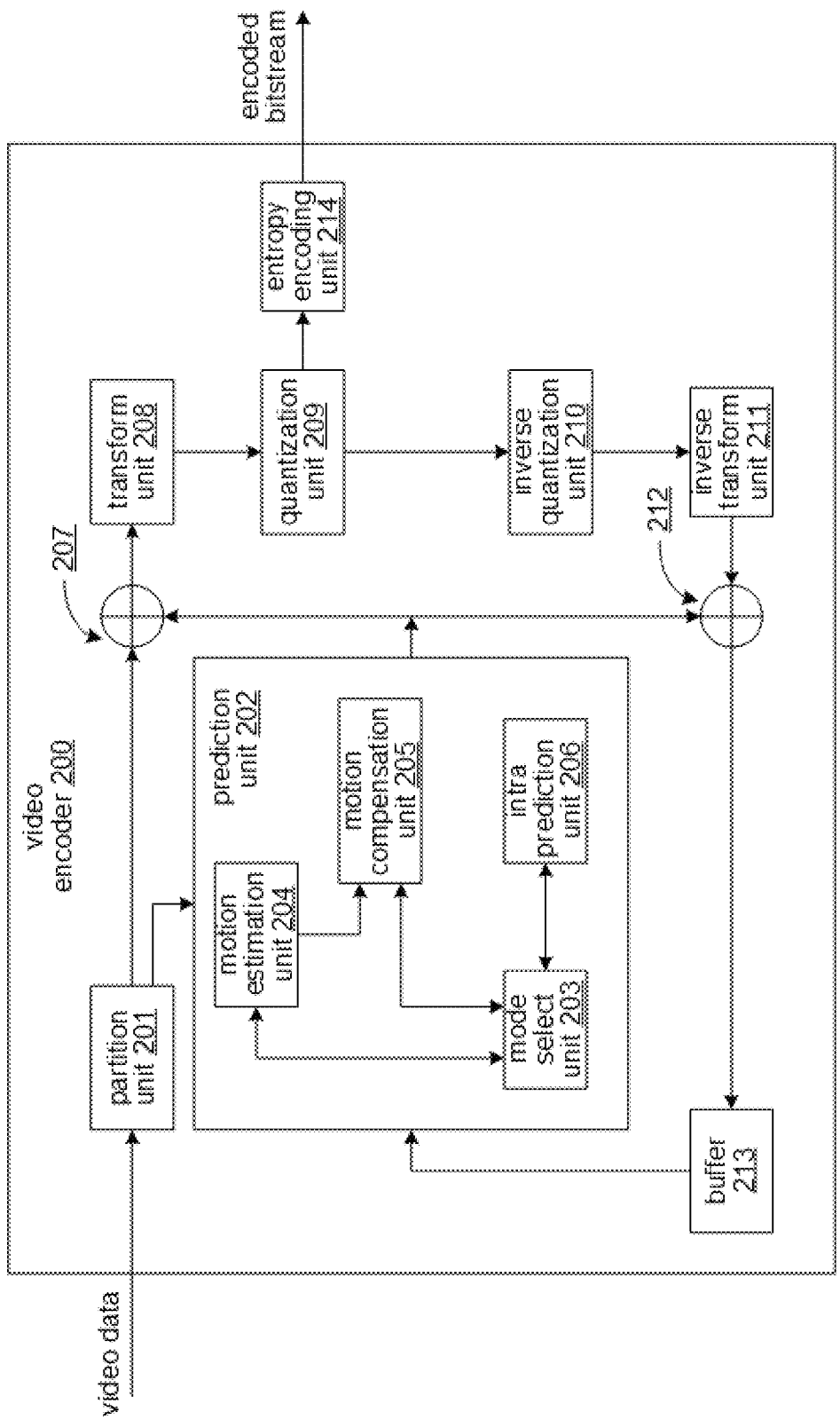
FIG. 11 is a block diagram that illustrates an encoder in accordance with some embodiments of the present disclosure.

FIG. 11 is a block diagram illustrating an example of video encoder 200, which may be video encoder 114 in the system 100 illustrated in FIG. 10.

Video encoder 200 may be configured to perform any or all of the embodiments of this disclosure. In the example of FIG. 11, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 11 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 12:
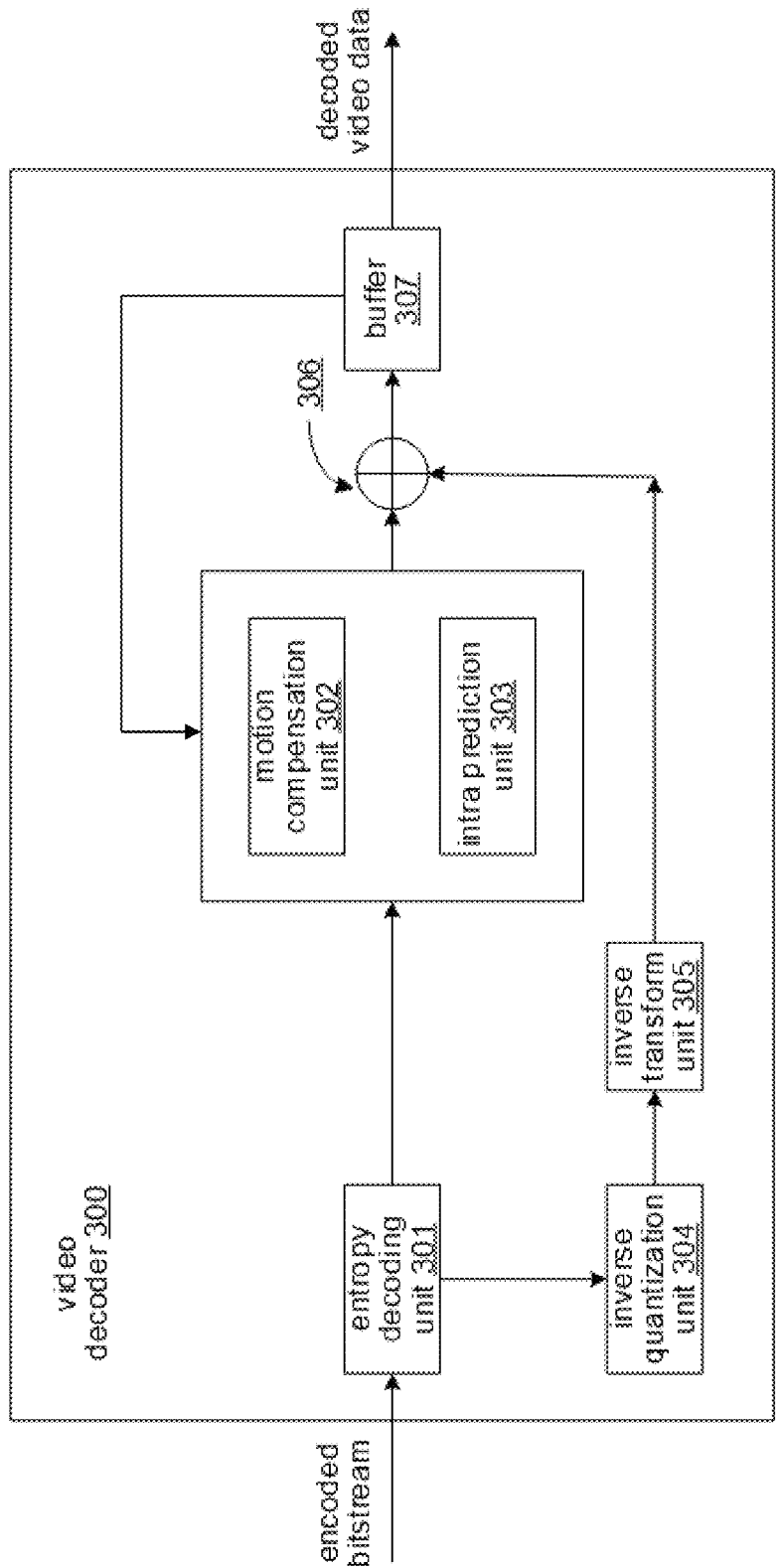
FIG. 12 is a block diagram that illustrates a decoder in accordance with some embodiments of the present disclosure.

FIG. 12 is a block diagram illustrating an example of video decoder 300 which may be video decoder 124 in the system 100 illustrated in FIG. 10.

The video decoder 300 may be configured to perform any or all of the embodiments of this disclosure. In the example of FIG. 12, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 12, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 11).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transformation unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments discussed in the previous section (e.g., item 1).

Figure 9:
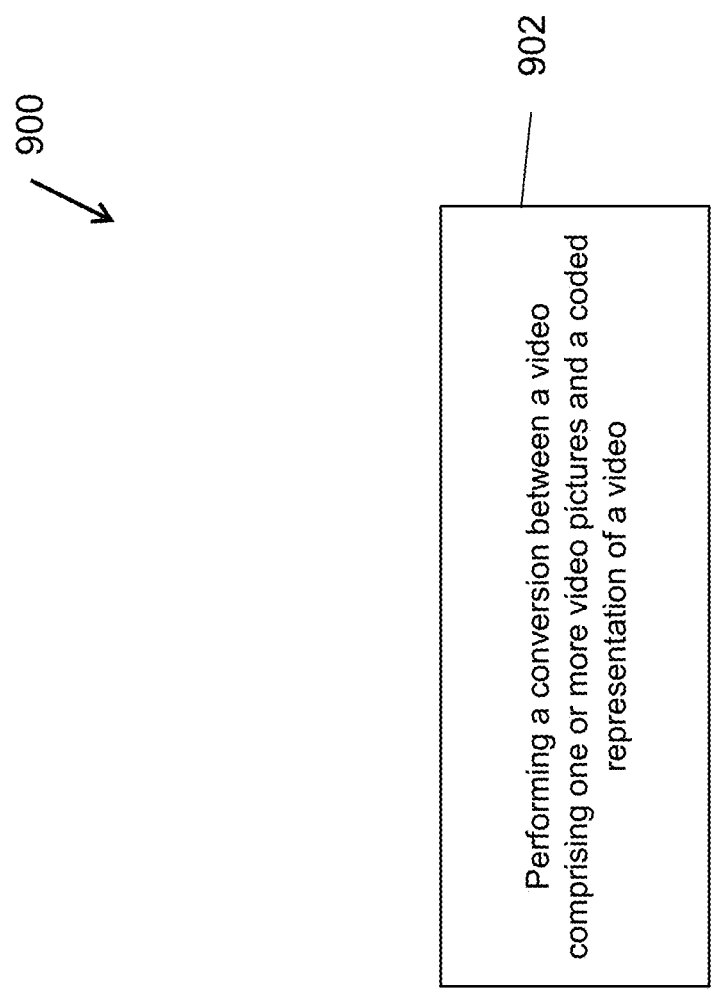
FIG. 9 is a flowchart for an example method of video processing.

1. A video processing method (e.g., method 900 depicted in FIG. 9), comprising: performing (902) a conversion between a video comprising one or more video pictures and a coded representation of a video, wherein the coded representation conforms to a format rule; wherein the format rule specifies that one or more syntax elements included in the coded representation related to a scaling window are permitted to have a value that indicates that a height or a width of the scaling window is greater than or equal to that of a corresponding video picture.

The following solutions show example embodiments discussed in the previous section (e.g., item 2).

2. A video processing method, comprising: performing a conversion between a video comprising one or more video pictures in one or more video layers and a coded representation of a video, wherein the coded representation conforms to a format rule; wherein the format rule specifies that permitted values of one or more syntax elements included in the coded representation related to a scaling window are constrained by a constraint rule, wherein the constraint rule depends on a relationship between a first layer of a current picture and a second layer of a reference picture of the current picture.

3. The method of solution 2, wherein the constraint rule specifies to permit all values if the relationship is that the first layer is same as the second layer.

The following solutions show example embodiments discussed in the previous section (e.g., item 3).

4. A video processing method, comprising: performing a conversion between a video comprising one or more video pictures comprising one or more video slices and a coded representation of a video, wherein the coded representation conforms to a format rule, wherein the format rule specifies that a syntax field is included in the coded representation indicative of whether reference picture resampling is enabled for a j-th entry in a reference picture list i for a video slice.

The following solutions show example embodiments discussed in the previous section (e.g., item 5).

5. A video processing method, comprising: performing a conversion between a video comprising one or more video layers comprising one or more video pictures a coded representation of a video, wherein the coded representation conforms to a format rule, wherein the format rule specifies that a syntax element is included in the coded representation in a parameter set, wherein the syntax element is indicative of whether reference picture resampling is enabled for a non-independent video layer, wherein a value of the syntax element is a function of a reference layer of the non-independent video layer.

6. The method of any of solutions 1 to 5, wherein the conversion comprises encoding the video into the coded representation.

7. The method of any of solutions 1 to 5, wherein the conversion comprises decoding the coded representation to generate pixel values of the video.

8. A video decoding apparatus comprising a processor configured to implement a method recited in one or more of solutions 1 to 7.

9. A video encoding apparatus comprising a processor configured to implement a method recited in one or more of solutions 1 to 7.

10. A computer program product having computer code stored thereon, the code, when executed by a processor, causes the processor to implement a method recited in any of solutions 1 to 7.

11. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

Figure 13:
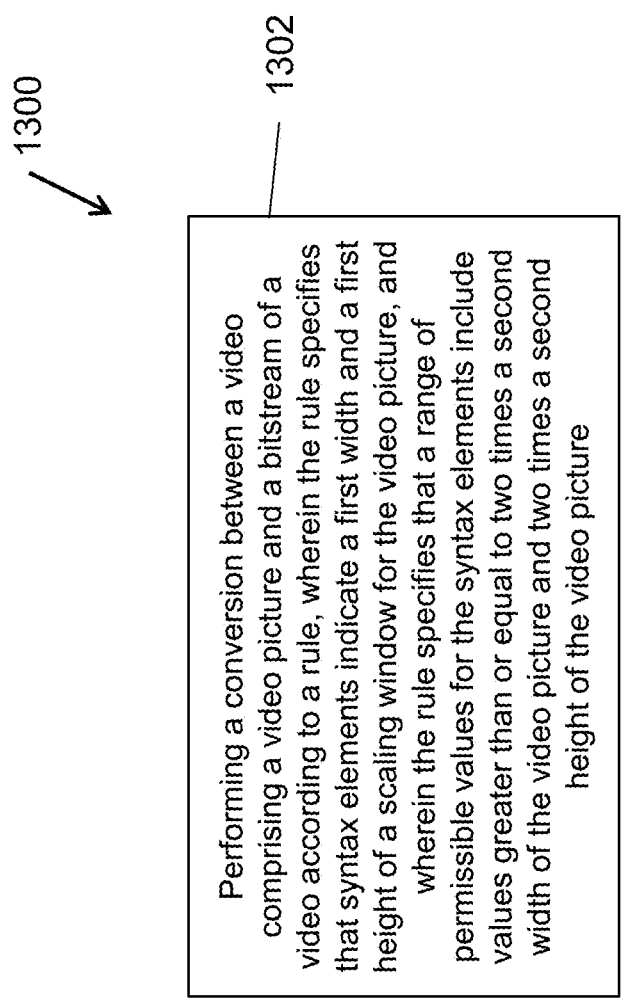
FIGS. 13 to 18 are flowcharts for example methods of video processing.

FIG. 13 is a flowchart for an example method 1300 of video processing. Operation 1302 includes performing a conversion between a video comprising a video picture and a bitstream of a video according to a rule, wherein the rule specifies that syntax elements indicate a first width and a first height of a scaling window for the video picture, and wherein the rule specifies that a range of permissible values for the syntax elements include values greater than or equal to two times a second width of the video picture and two times a second height of the video picture.

In some embodiments of method 1300, the values of the syntax elements specify offsets that are applied to a size of the video picture for scaling ratio calculation. In some embodiments of method 1300, the syntax elements include pps_scaling_win_left_offset, pps_scaling_win_right_offset, pps_scaling_win_top_offset, and pps_scaling_win_bottom_offset. In some embodiments of method 1300, the rule specifies that a value of SubWidthC*(pps_scaling_win_left_offset+pps_scaling_win_right_offset)) is greater than or equal to −pps_pic_width_in_luma_samples*M and less than pps_pic_width_in_luma_samples, wherein CurrPicScalWinWidthL is the first width of the scaling window, wherein pps_pic_width_in_luma_samples is the second width of the video picture, wherein SubWidthC is a width of a video block and obtained from a table according to a chroma format of the video picture that includes the video block, and wherein CurrPicScalWinWidthL=pps_pic_width_in_luma_samples−SubWidthC*(pps_scaling_win_right_offset+pps_scaling_win_left_offset). In some embodiments of method 1300, M is equal to 16, 8, 32, or 64.

In some embodiments of method 1300, the rule specifies that a value of SubHeightC*(pps_scaling_win_top_offset+pps_scaling_win_bottom_offset) is greater than or equal to −pps_pic_height_in_luma_samples*N and less than pps_pic_height_in_luma_samples, wherein CurrPicScalWinHeightL is the first height of the scaling window, wherein pps_pic_height_in_luma_samples is the second height of the video picture, wherein SubHeightC is a height of a video block and obtained from a table according to a chroma format of the video picture that includes the video block, and wherein CurrPicScalWinHeightL= pps_pic_height_in_luma_samples−SubHeightC*(pps_scaling_win_bottom_offset+pps_scaling_win_top_offset). In some embodiments of method 1300, N is equal to 16, 8, 32, or 64. In some embodiments of method 1300, M and N are dependent on a layout of subpictures of the video picture. In some embodiments of method 1300, M is equal to Ceil(pps_pic_width_in_luma_samples=minSubpicWidth), wherein minSubpicWidth is a minimum subpicture width of all subpictures in the picture referring to a picture parameter set, wherein pps_pic_width_in_luma_samples is the second width of the video picture, and wherein Ceil( ) function rounds a number up to a next largest integer.

In some embodiments of method 1300, N is equal to Ceil(pps_pic_height_in_luma_samples=minSubpicHeight), wherein minSubpicHeight is a minimum subpicture height of all subpictures in the video picture referring to a picture parameter set, wherein pps_pic_height_in_luma_samples is the second height of the video picture, and wherein Ceil( ) function rounds a number up to a next largest integer.

Figure 14:
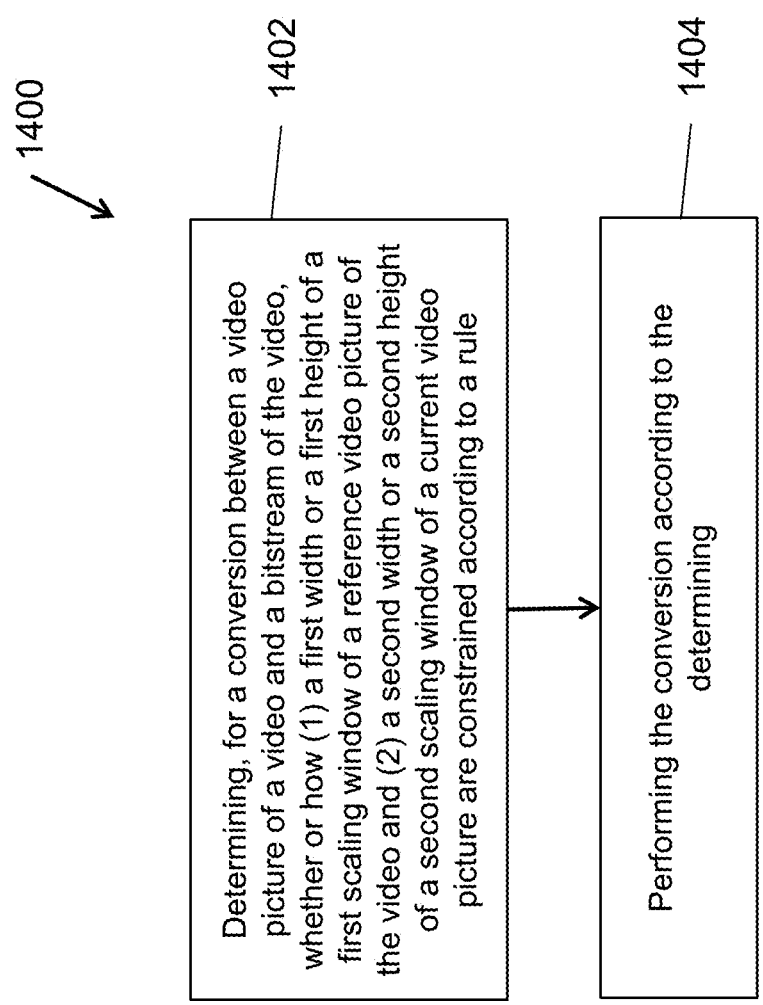

FIG. 14 is a flowchart for an example method 1400 of video processing. Operation 1402 includes determining, for a conversion between a video picture of a video and a bitstream of the video, whether or how (1) a first width or a first height of a first scaling window of a reference video picture of the video and (2) a second width or a second height of a second scaling window of a current video picture are constrained according to a rule. Operation 1404 includes performing the conversion according to the determining.

In some embodiments of method 1400, the rule specifies that there is an absence of constraint on the first width or the first height of the first scaling window and the second width or the second height of the second scaling window in response to the reference video picture and the current video picture being on different video layers. In some embodiments of method 1400, the rule specifies that: CurrPicScalWinWidthL*M is greater than or equal to refPicScalWinWidthL, CurrPicScalWinHeightL*M is greater than or equal to refPicScalWinHeightL, CurrPicScalWinWidthL is less than or equal to refPicScalWinWidthL*N, CurrPicScalWinHeightL is less than or equal to refPicScalWinHeightL*N, CurrPicScalWinWidthL*sps_pic_width_max_in_luma_samples is greater than or equal to refPicScalWinWidthL*(pps_pic_width_in_luma_samples−Max(K0, MinCbSizeY)), CurrPicScalWinHeightL*sps_pic_height_max_in_luma_samples is greater than or equal to refPicScalWinHeightL*(pps_pic_height_in_luma_samples−Max(K1, MinCbSizeY)), wherein CurrPicScalWinWidthL and CurrPicScalWinHeightL are the second width and the second height of the second scaling window of the current video picture, respectively, wherein refPicScalWinWidthL and refPicScalWinHeightL are the first width and the first height of the first scaling window of the reference video picture, respectively, wherein sps_pic_width_max_in_luma_samples is a maximum width in units of luma samples of each video picture referring to a sequence parameter set, and wherein pps_pic_width_in_luma_samples is a width of each video picture referring to a picture parameter set.

In some embodiments of method 1400, the rule specifies that M=M1 and N=N1 in response to the reference video picture and the current video picture being in a same video layer, wherein the rule specifies that M=M2 and N=N2 in response to the reference video picture and the current video picture being on different video layers, wherein M1 is less than or equal to M2, and wherein N1 is greater than or equal to N2. In some embodiments of method 1400, K0 or K1 is an integer value. In some embodiments of method 1400, K0 or K1 is a minimum allowed video picture width or a minimum allowed video picture height, respectively. In some embodiments of method 1400, K0 or K1 is 8.

Figure 15:
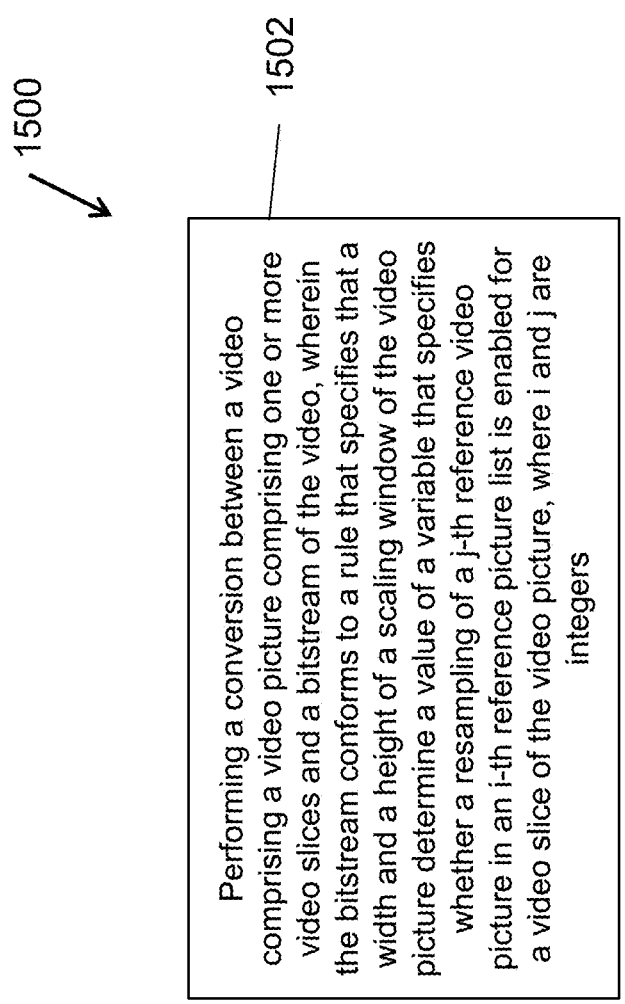

FIG. 15 is a flowchart for an example method 1500 of video processing. Operation 1502 includes performing a conversion between a video comprising a video picture comprising one or more video slices and a bitstream of the video, wherein the bitstream conforms to a rule that specifies that a width and a height of a scaling window of the video picture determine a value of a variable that specifies whether a resampling of a j-th reference video picture in an i-th reference picture list is enabled for a video slice of the video picture, where i and j are integers.

In some embodiments of method 1500, the variable is RprConstraintsActive[i][j], wherein the rule specifies that RprConstraintsActive[i][j]=(CurrPicScalWinWidthL !=fRefWidth||CurrPicScalWinHeightL !=fRefHeight), wherein fRefWidth and fRefHeight are values of CurrPicScalWinWidthL and CurrPicScalWinHeightL, respectively, of the j-th reference video picture. In some embodiments of method 1500, the rule specifies that the value of the variable is based on a first video layer to which the j-th reference video picture belongs and a second video layer to which a current video picture belongs. In some embodiments of method 1500, the rule specifies that the value of the variable is based on whether the first video layer of the j-th reference video picture and the second video layer of the current video picture are a same video layer.

Figure 16:
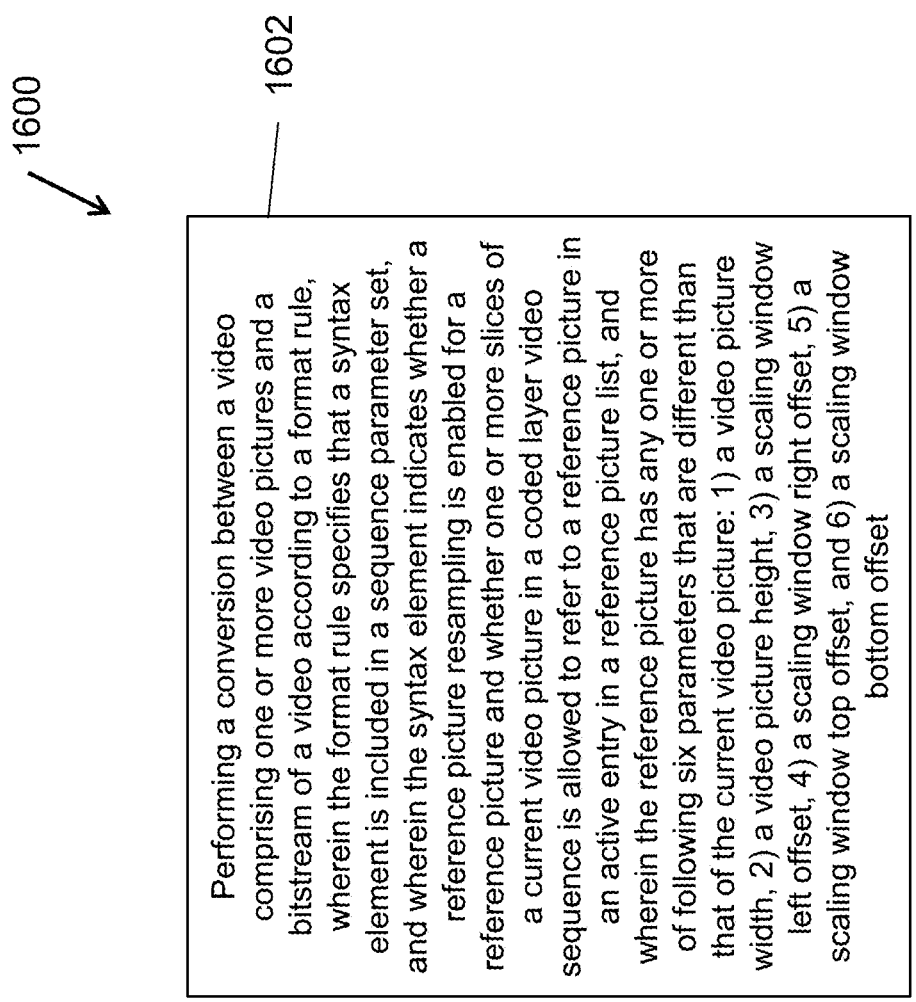

FIG. 16 is a flowchart for an example method 1600 of video processing. Operation 1602 includes performing a conversion between a video comprising one or more video pictures and a bitstream of a video according to a format rule, wherein the format rule specifies that a syntax element is included in a sequence parameter set, and wherein the syntax element indicates whether a reference picture resampling is enabled for a reference picture and whether one or more slices of a current video picture in a coded layer video sequence is allowed to refer to a reference picture in an active entry in a reference picture list, and wherein the reference picture has any one or more of following six parameters that are different than that of the current video picture: 1) a video picture width, 2) a video picture height, 3) a scaling window left offset, 4) a scaling window right offset, 5) a scaling window top offset, and 6) a scaling window bottom offset.

In some embodiments of method 1600, the syntax element having a value of 1 indicates that the reference picture resampling is enabled and that the one or more slices of the current video picture in the coded layer video sequence is allowed to refer to the reference picture in the active entry in the reference picture list. In some embodiments of method 1600, the syntax element having a value of 0 indicates that the reference picture resampling is disabled and that no slice of the current video picture in the coded layer video sequence is allowed to refer to the reference picture in the active entry of the reference picture list.

Figure 17:
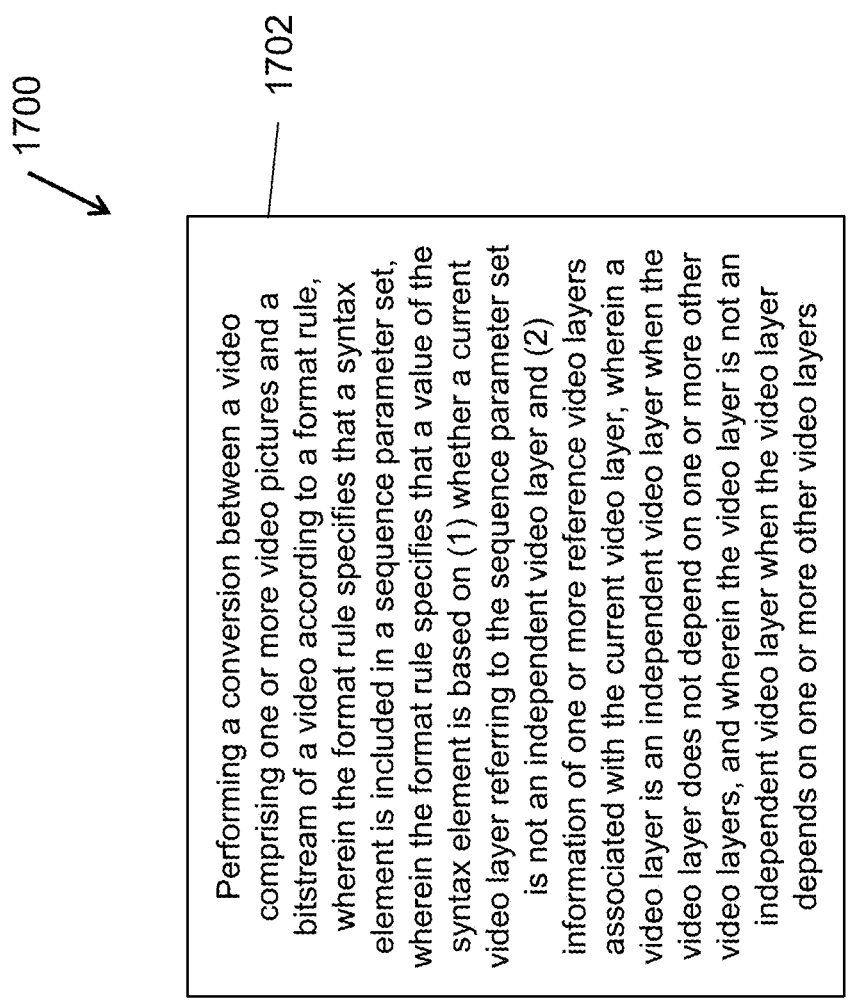

FIG. 17 is a flowchart for an example method 1700 of video processing. Operation 1702 includes performing a conversion between a video comprising one or more video pictures and a bitstream of a video according to a format rule, wherein the format rule specifies that a syntax element is included in a sequence parameter set, wherein the format rule specifies that a value of the syntax element is based on (1) whether a current video layer referring to the sequence parameter set is not an independent video layer and (2) information of one or more reference video layers associated with the current video layer, wherein a video layer is an independent video layer when the video layer does not depend on one or more other video layers, and wherein the video layer is not an independent video layer when the video layer depends on one or more other video layers.

In some embodiments of method 1700, the format rule specifies that the value of the syntax element is 1 in response to (1) the current video layer with a nuh_layer_id that is same as that of the sequence parameter set is not an independent video layer such that the current video layer depends on one or more other video layers, and (2) at least one reference video layer of the current video layer has a different spatial resolution than the current video layer. In some embodiments of method 1700, the format rule specifies that the value of the syntax element is 1 in response to (1) at least one video layer that refers to the sequence parameter set is not an independent video layer such that the at least one video layer depends on one or more other video layers, and (2) at least one reference video layer of the at least one video layer has a different spatial resolution than the current video layer. In some embodiments of method 1700, at least one slice is included in at least one video picture that refers to the sequence parameter set, and wherein the format rule specifies that the value of the syntax element is 1 in response to the at least one slice referring to a reference picture in an inter-layer reference picture entry of a reference picture list that has any one or more of following six parameters that are different than that of the at least one video picture: 1) a video picture width, 2) a video picture height, 3) a scaling window left offset, 4) a scaling window right offset, 5) a scaling window top offset, and 6) a scaling window bottom offset.

Figure 18:
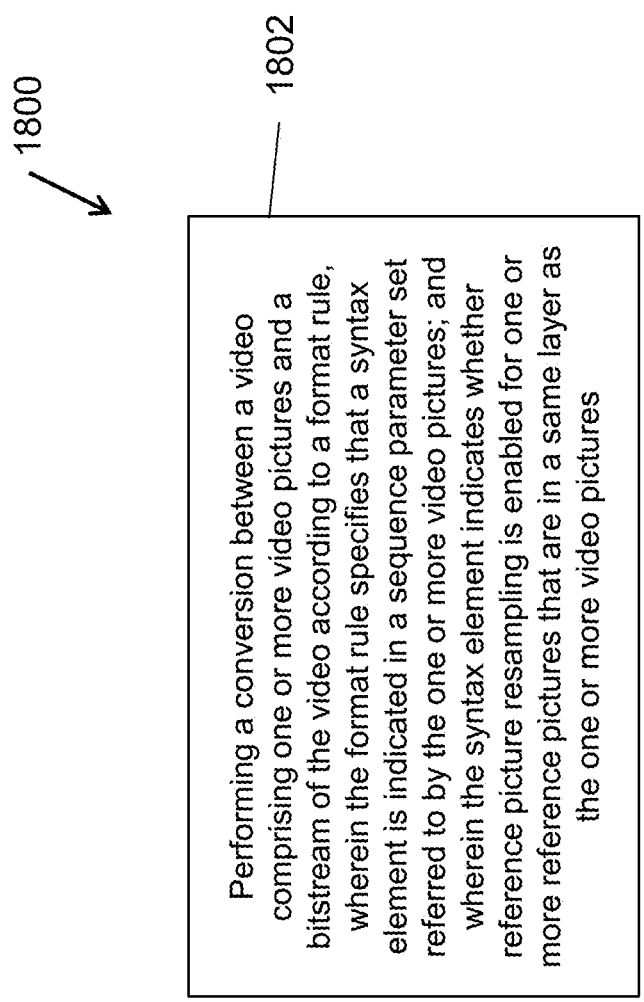

FIG. 18 is a flowchart for an example method 1800 of video processing. Operation 1802 includes performing a conversion between a video comprising one or more video pictures and a bitstream of the video according to a format rule, wherein the format rule specifies that a syntax element is indicated in a sequence parameter set referred to by the one or more video pictures; and wherein the syntax element indicates whether reference picture resampling is enabled for one or more reference pictures that are in a same layer as the one or more video pictures.

In some embodiments of method 1800, the format rule specifies that a value of the syntax element is 1 which indicates that: (a) the reference picture resampling is enabled for the one or more reference pictures that are in the same layer as the one or more video pictures, and (b) one or more slices of the one or more video pictures in a coded layer video sequence refer to a reference picture in an active entry of a reference picture list that (1) has a same nuh_layer_id value as that of a current video picture of the one or more video pictures and (2) has any one or more of following six parameters that are different than that of the current video picture: 1) a video picture width, 2) a video picture height, 3) a scaling window left offset, 4) a scaling window right offset, 5) a scaling window top offset, and 6) a scaling window bottom offset.

In some embodiments of method 1800, the format rule specifies that a value of the syntax element is 0 which indicates that: (a) the reference picture resampling is disabled for the one or more reference pictures that are in the same layer as the one or more video pictures, and (b) no slice of the one or more video pictures in a coded layer video sequence refer to a reference picture in an active entry of a reference picture list that (1) has a same nuh_layer_id value as that of a current video picture of the one or more video pictures and (2) has any one or more of following six parameters that are different than that of the current video picture: 1) a video picture width, 2) a video picture height, 3) a scaling window left offset, 4) a scaling window right offset, 5) a scaling window top offset, and 6) a scaling window bottom offset. In some embodiments of method 1800, the format rule specifies that a value of the syntax element is 1 which indicates that the reference picture resampling is enabled for a reference picture that is in the same layer as the one or more video pictures, and wherein the reference picture is associated with RprConstraintsActive[i][j] being equal to 1, and wherein the reference picture is a j-th entry in a reference picture list i for a current slice, and wherein the j-th entry in the reference picture list i has a same nuh_layer_id value as that of a current video picture of the one or more video pictures.

In some embodiments of method 1800, the format rule specifies that the syntax element is included in a bitstream before a second syntax element that indicates whether a picture spatial resolution changes within a coded layer video sequence referring to the sequence parameter set. In some embodiments of method 1800, the format rule specifies that the bitstream excludes a second syntax element that indicates whether a picture spatial resolution changes within a coded layer video sequence referring to the sequence parameter set, wherein the format rule specifies that a second value of the second syntax element is inferred to be 0, and wherein the format rule specifies that the bitstream excludes the second syntax element in response to a value of the syntax element being equal to 0.

In some embodiments of method(s) 1300-1800, performing the conversion comprises encoding the video into the bitstream. In some embodiments of method(s) 1300-1800, performing the conversion comprises generating the bitstream from the video, and the method further comprises storing the bitstream in a non-transitory computer-readable recording medium. In some embodiments of method(s) 1300-1800, performing the conversion comprises decoding the video from the bitstream. In some embodiments, a video decoding apparatus comprises a processor configured to implement a method recited in one or more embodiments of method(s) 1300-1800. In some embodiments, a video encoding apparatus comprises a processor configured to implement a method recited in one or more embodiments of method(s) 1300-1800. In some embodiments, a computer program product has computer instructions stored thereon, the instructions, when executed by a processor, cause the processor to implement a method recited in embodiments of method(s) 1300-1800. In some embodiments, a non-transitory computer-readable storage medium stores a bitstream generated according to the method in embodiments of method(s) 1300-1800. In some embodiments, a non-transitory computer-readable storage medium stores instructions that cause a processor to implement a method recited in embodiments of method(s) 1300-1800. In some embodiments, a method of bitstream generation, comprises: generating a bitstream of a video according to a method recited in embodiments of method(s) 1300-1800, and storing the bitstream on a computer-readable program medium. Other embodiments include a method, an apparatus, and/or a bitstream generated according to a disclosed method or a system described in the present disclosure.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the present disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
    performing a conversion between a video comprising a video picture and a bitstream of the video according to a rule,
    wherein the rule specifies that a first syntax element is included in a sequence parameter set that the video picture refers to,
    wherein the first syntax element indicates whether a reference picture resampling is enabled and whether one or more slices of the video picture are allowed to refer to a reference picture in an active entry in a reference picture list, and
    wherein the reference picture has one or more of multiple parameters that are different than that of the video picture, the multiple parameters include the following six parameters: 1) a video picture width, 2) a video picture height, 3) a scaling window left offset, 4) a scaling window right offset, 5) a scaling window top offset, and 6) a scaling window bottom offset, which are specified by second syntax elements.

2. The method of claim 1, wherein the first syntax element having a value of 1 indicates that the reference picture resampling is enabled and that the video picture is allowed to have one or more slices that refer to the reference picture in the active entry in the reference picture list.

3. The method of claim 1, wherein the first syntax element having a value of 0 indicates that the reference picture resampling is disabled and that no slice of the video picture is allowed to refer to the reference picture in the active entry of the reference picture list.

4. The method of claim 1, wherein the rule specifies that second syntax elements indicate a first width and a first height of a scaling window for the video picture, and
    wherein the rule specifies that a range of permissible values for the first width and the first height that are indicated by the second syntax elements are allowed to be greater than or equal to two times a second width of the video picture and two times a second height of the video picture.

5. The method of claim 4, wherein values of the second syntax elements specify offsets that are applied to a size of the video picture for scaling ratio calculation.

6. The method of claim 4, wherein the second syntax elements include pps_scaling_win_left_offset, pps_scaling_win_right_offset, pps_scaling_win_top_offset, and pps_scaling_win_bottom_offset.

7. The method of claim 6, wherein the rule specifies that a value of SubWidthC*(pps_scaling_win_left_offset+pps_scaling_win_right_offset) is greater than or equal to −pps_pic_width_in_luma_samples*M, and less than pps_pic_width_in_luma_samples,
    wherein CurrPicScalWinWidthL is the first width of the scaling window,
    wherein pps_pic_width_in_luma_samples is the second width of the video picture,
    wherein SubWidthC is a chroma width sampling variable of the video picture and obtained from a table according to a chroma format of the video picture,
    wherein CurrPicScalWinWidthL=pps_pic_width_in_luma_samples−SubWidthC*(pps_scaling_win_right_offset+pps_scaling_win_left_offset), and
    wherein M is a positive integer value that is greater than or equal to 2.

8. The method of claim 7, wherein the rule specifies that a value of SubHeightC*(pps_scaling_win_top_offset+pps_scaling_win_bottom_offset) is greater than or equal to −pps_pic_height_in_luma_samples*N and less than pps_pic_height_in_luma_samples,
    wherein CurrPicScalWinHeightL is the first height of the scaling window,
    wherein pps_pic_height_in_luma_samples is the second height of the video picture, wherein SubHeightC is a chroma height sampling variable of the video picture and obtained from the table according to the chroma format of the video picture, wherein CurrPicScalWinHeightL=pps_pic_height_in_luma_samples−SubHeightC*(pps_scaling_win_bottom_offset+pps_scaling_win_top_offset), and wherein N is a positive integer value that is greater than or equal to 2.

9. The method of claim 8, wherein N is equal to M.

10. The method of claim 1, wherein the performing the conversion comprises encoding the video into the bitstream.

11. The method of claim 1, wherein the performing the conversion comprises decoding the video from the bitstream.

12. An apparatus for processing video data comprising a processor and a non-transitory memory with instructions thereon, wherein the instructions upon execution by the processor, cause the processor to:

perform a conversion between a video comprising a video picture and a bitstream of the video according to a rule, wherein the rule specifies that a first syntax element is included in a sequence parameter set that the video picture refers to, wherein the first syntax element indicates whether a reference picture resampling is enabled and whether one or more slices of the video picture are allowed to refer to a reference picture in an active entry in a reference picture list, and wherein the reference picture has one or more of multiple parameters that are different than that of the video picture, the multiple parameters include the following six parameters: 1) a video picture width, 2) a video picture height, 3) a scaling window left offset, 4) a scaling window right offset, 5) a scaling window top offset, and 6) a scaling window bottom offset, which are specified by second syntax elements.

13. The apparatus of claim 12, wherein the first syntax element having a value of 1 indicates that the reference picture resampling is enabled and that the video picture is allowed to have one or more slices that refer to the reference picture in the active entry in the reference picture list, and wherein the first syntax element having a value of 0 indicates that the reference picture resampling is disabled and that no slice of the video picture is allowed to refer to the reference picture in the active entry of the reference picture list.

14. The apparatus of claim 12, wherein the rule specifies that second syntax elements indicate a first width and a first height of a scaling window for the video picture, and wherein the rule specifies that a range of permissible values for the first width and the first height that are indicated by the second syntax elements are allowed to be greater than or equal to two times a second width of the video picture and two times a second height of the video picture.

15. The apparatus of claim 14, wherein values of the second syntax elements specify offsets that are applied to a size of the video picture for scaling ratio calculation.

16. The apparatus of claim 14, wherein the second syntax elements include pps_scaling_win_left_offset, pps_scaling_win_right_offset, pps_scaling_win_top_offset, and pps_scaling_win_bottom_offset, wherein the rule specifies that a value of SubWidthC*(pps_scaling_win_left_offset+pps_scaling_win_right_offset) is greater than or equal to −pps_pic_width_in_luma_samples*M and less than pps_pic_width_in_luma_samples, wherein CurrPicScalWinWidthL is the first width of the scaling window, wherein pps_pic_width_in_luma_samples is the second width of the video picture, wherein SubWidthC is a chroma width sampling variable of the video picture and obtained from a table according to a chroma format of the video picture, wherein CurrPicScalWinWidthL=pps_pic_width_in_luma_samples−SubWidthC*(pps_scaling_win_right_offset+pps_scaling_win_left_offset), wherein M is a positive integer value that is greater than or equal to 2, wherein the rule specifies that a value of SubHeightC*(pps_scaling_win_top_offset+pps_scaling_win_bottom_offset) is greater than or equal to −pps_pic_height_in_luma_samples*N and less than pps_pic_height_in_luma_samples, wherein CurrPicScalWinHeightL is the first height of the scaling window, wherein pps_pic_height_in_luma_samples is the second height of the video picture, wherein SubHeightC is a chroma height sampling variable of the video picture and obtained from the table according to the chroma format of the video picture, wherein CurrPicScalWinHeightL=pps_pic_height_in_luma_samples−SubHeightC*(pps_scaling_win_bottom_offset+pps_scaling_win_top_offset), wherein N is a positive integer value that is greater than or equal to 2, and wherein N is equal to M.

17. A non-transitory computer-readable storage medium storing instructions that cause a processor to:

perform a conversion between a video comprising a video picture and a bitstream of the video according to a rule, wherein the rule specifies that a first syntax element is included in a sequence parameter set that the video picture refers to, wherein the first syntax element indicates whether a reference picture resampling is enabled and whether one or more slices of the video picture are allowed to refer to a reference picture in an active entry in a reference picture list, and wherein the reference picture has one or more of multiple parameters that are different than that of the video picture, the multiple parameters include the following six parameters: 1) a video picture width, 2) a video picture height, 3) a scaling window left offset, 4) a scaling window right offset, 5) a scaling window top offset, and 6) a scaling window bottom offset, which are specified by second syntax elements.

18. The non-transitory computer-readable storage medium of claim 17, wherein the first syntax element having a value of 1 indicates that the reference picture resampling is enabled and that the video picture is allowed to have one or more slices that refer to the reference picture in the active entry in the reference picture list, wherein the first syntax element having a value of 0 indicates that the reference picture resampling is disabled and that no slice of the video picture is allowed to refer to the reference picture in the active entry of the reference picture list, wherein the rule specifies that second syntax elements indicate a first width and a first height of a scaling window for the video picture, wherein the rule specifies that a range of permissible values for the first width and the first height that are indicated by the second syntax elements are allowed to be greater than or equal to two times a second width of the video picture and two times a second height of the video picture, wherein values of the second syntax elements specify offsets that are applied to a size of the video picture for scaling ratio calculation, and the second syntax elements include pps_scaling_win_left_offset, pps_scaling_win_right_offset, pps_scaling_win_top_offset, and pps_scaling_win_bottom_offset, wherein the rule specifies that a value of SubWidthC*(pps_scaling_win_left_offset+pps_scaling_win_right_offset)) is greater than or equal to pps_pic_width_in_luma_samples*M and less than pps_pic_width_in_luma_samples, wherein CurrPicScalWinWidthL is the first width of the scaling window, wherein pps_pic_width_in_luma_samples is the second width of the video picture, wherein SubWidthC is a chroma width sampling variable of the video picture and obtained from a table according to a chroma format of the video picture, wherein CurrPicScalWinWidthL=pps_pic_width_in_luma_samples−SubWidthC*(pps_scaling_win_right_offset+pps_scaling_win_left_offset), wherein M is a positive integer value that is greater than or equal to 2, wherein the rule specifies that a value of SubHeightC*(pps_scaling_win_top_offset+pps_scaling_win_bottom_offset) is greater than or equal to −pps_pic_height_in_luma_samples*N and less than pps_pic_height_in_luma_samples, wherein CurrPicScalWinHeightL is the first height of the scaling window, wherein pps_pic_height_in_luma_samples is the second height of the video picture, wherein SubHeightC is a chroma height sampling variable of the video picture and obtained from the table according to the chroma format of the video picture, wherein CurrPicScalWinHeightL=pps_pic_height_in_luma_samples−SubHeightC*(pps_scaling_win_bottom_offset+pps_scaling_win_top_offset), and wherein N is a positive integer value that is greater than or equal to 2, and N is equal to M.

19. A non-transitory computer-readable recording medium storing a bitstream of a video which is generated by a method performed by a video processing apparatus, wherein the method comprises:

generating the bitstream of the video comprising a video picture according to a rule, wherein the rule specifies that a first syntax element is included in a sequence parameter set that the video picture refers to, wherein the first syntax element indicates whether a reference picture resampling is enabled and whether one or more slices of the video picture are allowed to refer to a reference picture in an active entry in a reference picture list, and wherein the reference picture has one or more of multiple parameters that are different than that of the video picture, the multiple parameters include the following six parameters: 1) a video picture width, 2) a video picture height, 3) a scaling window left offset, 4) a scaling window right offset, 5) a scaling window top offset, and 6) a scaling window bottom offset, which are specified by second syntax elements.

20. The non-transitory computer-readable recording medium of claim 19, wherein the first syntax element having a value of 1 indicates that the reference picture resampling is enabled and that the video picture is allowed to have one or more slices that refer to the reference picture in the active entry in the reference picture list, wherein the first syntax element having a value of 0 indicates that the reference picture resampling is disabled and that no slice of the video picture is allowed to refer to the reference picture in the active entry of the reference picture list, wherein the rule specifies that second syntax elements indicate a first width and a first height of a scaling window for the video picture, wherein the rule specifies that a range of permissible values for the first width and the first height that are indicated by the second syntax elements are allowed to be greater than or equal to two times a second width of the video picture and two times a second height of the video picture, wherein values of the second syntax elements specify offsets that are applied to a size of the video picture for scaling ratio calculation, and the second syntax elements include pps_scaling_win_left_offset, pps_scaling_win_right_offset, pps_scaling_win_top_offset, and pps_scaling_win_bottom_offset, wherein the rule specifies that a value of SubWidthC*(pps_scaling_win_left_offset+pps_scaling_win_right_offset)) is greater than or equal to pps_pic_width_in_luma_samples*M and less than pps_pic_width_in_luma_samples, wherein CurrPicScalWinWidthL is the first width of the scaling window, wherein pps_pic_width_in_luma_samples is the second width of the video picture, wherein SubWidthC is a chroma width sampling variable of the video picture and obtained from a table according to a chroma format of the video picture, wherein CurrPicScalWinWidthL=pps_pic_width_in_luma_samples-SubWidthC*(pps_scaling_win_right_offset+pps_scaling_win_left_offset), wherein M is a positive integer value that is greater than or equal to 2, wherein the rule specifies that a value of SubHeightC*(pps_scaling_win_top_offset+pps_scaling_win_bottom_offset) is greater than or equal to −pps_pic_height_in_luma_samples*N and less than pps_pic_height_in_luma_samples, wherein CurrPicScalWinHeightL is the first height of the scaling window, wherein pps_pic_height_in_luma_samples is the second height of the video picture, wherein SubHeightC is a chroma height sampling variable of the video picture and obtained from the table according to the chroma format of the video picture, wherein CurrPicScalWinHeightL=pps_pic_height_in_luma_samples-SubHeightC*(pps_scaling_win_bottom_offset+pps_scaling_win_top_offset), and wherein N is a positive integer value that is greater than or equal to 2, and N is equal to M.

* * * * *